US010963675B2

(12) United States Patent
Boic

(10) Patent No.: US 10,963,675 B2
(45) Date of Patent: Mar. 30, 2021

(54) METHOD FOR SELECTING IMAGES IN VIDEO OF FACES IN THE WILD

(71) Applicant: REALNETWORKS, INC., Seattle, WA (US)

(72) Inventor: Milko Boic, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 78 days.

(21) Appl. No.: 16/262,590

(22) Filed: Jan. 30, 2019

(65) Prior Publication Data

US 2020/0242336 A1 Jul. 30, 2020

(51) Int. Cl.
*G06K 9/00* (2006.01)

(52) U.S. Cl.
CPC ..... *G06K 9/00275* (2013.01); *G06K 9/00228* (2013.01); *G06K 9/00268* (2013.01)

(58) Field of Classification Search
CPC .......... G06K 9/00275; G06K 9/00268; G06K 9/00228
See application file for complete search history.

(56) References Cited

U.S. PATENT DOCUMENTS

2009/0316962 A1\* 12/2009 Sun .................... G06K 9/00288
382/118
2010/0172579 A1 7/2010 Reid et al.
2013/0266193 A1\* 10/2013 Tiwari ................ G06F 16/5854
382/115
2014/0044348 A1\* 2/2014 Chen .................. G06K 9/00275
382/159
2014/0301599 A1 10/2014 Shin et al.
2016/0269401 A1\* 9/2016 Saito ....................... G06F 21/32
2019/0114760 A1\* 4/2019 Ni ........................ G06K 9/3208

FOREIGN PATENT DOCUMENTS

JP 2000149018 A 5/2000
JP 20150059466 A 6/2015

OTHER PUBLICATIONS

PCT/US2020/015686—International Search Report and Written Opinion, dated May 28, 2020, 10 pages.
Russell, Jon, "Alibaba debuts 'smile to pay' facial recognition payments at KFC in China," TechCrunch, 2017, 11 pages, https://techcrunch.com/2017/09/03/alibaba-debuts-smile-to-pay/, retrieved Nov. 30, 2020.

\* cited by examiner

*Primary Examiner* — Tom Y Lu
(74) *Attorney, Agent, or Firm* — Seed IP Law Group LLP

(57) ABSTRACT

Technologies are provided herein for selecting one or more subimages to be processed from a plurality of images received. A subset of images is identified, from the plurality of images received, that include a face image. The face image is assessed to generate assessment information regarding one or more of a size of the face image, a pose of the face in the face image, sharpness of the face image, and contrast quality of the face image. Each aspect of the assessment information is compared with corresponding criteria and, as a result of determining that the assessment information satisfies the criteria, facial recognition processing is performed on the face image.

23 Claims, 13 Drawing Sheets

METHOD FOR SELECTING IMAGES IN VIDEO OF FACES IN THE WILD

BACKGROUND

Technical Field

The present disclosure relates to systems and methods for processing facial images.

Description of the Related Art

Some processor-based systems are configured to process images in order to recognize objects, persons, places, animals, or other such features depicted. Previously, users of some image processing systems had to manually select which images to process because the processing power of such systems is limited. However, in situations where there is a large amount of image data, it becomes impracticable to process a substantial amount of data to recognize particular objects or persons. For instance, in public spaces, such as airports and city streets, the amount of human traffic is far too large for any reasonable number of users to select which images to process in an acceptable time period. Moreover, it may be difficult and time consuming for a user to select which depictions of persons or objects in the images are suitable for processing. This problem becomes even more challenging with video data that includes a series of images as the users are required to process the video data in real-time. Existing computer systems are insufficiently equipped or configured to solve this problem, and thus the ability of image processing systems is significantly limited in such situations.

BRIEF SUMMARY

A computer-implemented method may be summarized as including receiving a plurality of images; and for each of one or more face images in the plurality of images: generating assessment information that includes contrast information regarding a contrast quality of the face image; comparing the assessment information for the face image with a set of criteria that includes a contrast quality criterion; determining, as a result of comparing the assessment information with the set of criteria, whether the assessment information associated with the face image satisfies the set of criteria; and identifying, in response to determining that the assessment information satisfies the set of criteria, the face image as being qualified for facial recognition processing.

The assessment information may include sharpness information regarding a sharpness of the face image, the set of criteria may include a sharpness criterion, and determining that the assessment information satisfies the set of criteria may include determining that the sharpness information satisfies the sharpness criterion. Generating the sharpness information may include performing a downsampling operation on the face image and determining a sharpness differential between the face image and a result of the downsampling operation, and determining that the assessment information satisfies the set of criteria may include determining that the sharpness differential satisfies the sharpness criterion. Generating the contrast information may include identifying a plurality of features in the face image that correspond to predetermined facial features; determining a plurality of regions of the face image that respectively surround a feature of the plurality of features; assigning contrast values to each region of the plurality of regions based on a maximum pixel contrast of pixels in each region; and determining a sum of the contrast values of the plurality of regions. Determining that the assessment information satisfies the set of criteria may include determining that the sum of the contrast values satisfies the contrast criterion. The set of criteria may include an orientation criterion, and generating the assessment information may include generating orientation information that includes estimating an orientation of the face in the face image, and determining that the assessment information satisfies the set of criteria may include determining that the orientation information satisfies the orientation criterion. The assessment information may include size information identifying one or more size dimensions of the face image, the set of criteria may include a size criterion, and determining that the assessment information satisfies the set of criteria may include determining that the size information satisfies a size threshold in the set of criteria.

The face image may be a first face image, the assessment information may be first assessment information including first contrast information, and the method may further include obtaining a second face image; generating second assessment information of the second face image that includes second contrast information regarding a contrast quality of the second face image; determining that the second assessment information satisfies a second set of criteria that includes a second facial contrast quality criterion; and generating, as a result of determining that the second assessment information satisfies the second set of criteria, a biometric signature of the second face image.

The computer-implemented method may further include generating a first biometric signature of the first face image and comparing the first biometric signature of the first face image to the second biometric signature of the second face image. Each criterion of the second set of criteria may include different values than each corresponding criterion of the set of criteria.

The computer-implemented method may further include storing the biometric signature as a result of determining that the second assessment information represents an improvement over a stored biometric image.

The second face image may be obtained at a second time and the method may further include storing a biometric signature of the first face image as being associated with an identity in data storage at a first time previous to the second time; and storing the biometric signature of the second face image as a result of a determination that a time period between the first time and the second time exceeds a predetermined threshold.

The computer-implemented method may further include generating a biometric signature of the face image and a second biometric signature for a second face image consecutive to the face image in the plurality of images; and determining an image differential based on a comparison of the biometric signature and the second biometric signature, wherein analyzing the face in the face image is performed as a result of the image differential being less than a predetermined threshold for image consistency.

The method may further include detecting face images in at least a subset of images of the plurality of images, wherein generating the assessment information is in response to detecting the face image in the subset of images.

The method may further include analyzing the face in the face image to determine an identity of a person corresponding to the face.

A system, may be summarized as including one or more processors; and non-transitory storage medium storing a set of instructions that, as a result of execution by the one or more processors, cause the system to: receive a plurality of images; and for each of one or more face images in the plurality of images: generate assessment information that includes contrast information regarding a contrast quality of the face image; compare the assessment information with a set of criteria that includes a contrast quality criterion; and generate, as a result of determining that the assessment information satisfies the set of criteria, result information indicating that the assessment information associated with the face image satisfies the set of criteria.

The instructions, as a result of execution by the one or more processors, may further cause the system to transmit, to a second system, the result information for authorizing the second system to perform facial recognition processing using the face image.

The instructions, as a result of execution by the one or more processors, may further cause the system to generate a biometric signature of the face image; and compare, as a result of determining that the assessment information satisfies the set of criteria, the biometric signature with a plurality of biometric signatures stored in data storage.

The instructions, as a result of execution by the one or more processors, may further cause the system to determine, as a result of comparing the biometric signature with the plurality of biometric signatures, that the biometric signature does not correspond to a stored identity; and create a new identity corresponding to the biometric signature.

The instructions, as a result of execution by the one or more processors, may further cause the system to determine, as a result of comparing the biometric signature with the plurality of biometric signatures, that the biometric signature corresponds to a plurality of stored identities; and merge the plurality of identities into a single stored identity. The assessment information may include a size of the face image, pose information regarding an orientation of a face in the face image, and sharpness information regarding a sharpness of the face image, and the set of criteria may include a size criterion, an orientation criterion, and a sharpness criterion.

The instructions, as a result of execution by the one or more processors, may further cause the system to identify a plurality of features in the face image that correspond to predetermined facial features; determine a plurality of regions of the face image that respectively surround each feature of the plurality of features; compute maximum pixel difference values for the plurality of regions; and compute an average pixel difference of the maximum pixel difference values, wherein the contrast information corresponds to the average pixel difference.

A non-transitory computer-readable medium storing computer-executable instructions that, as a result of execution by a processor, may be summarized as causing the processor to obtain a plurality of images; and for each of one or more face images in the plurality of images: generate assessment information that includes contrast information regarding a contrast quality of the face image; compare the assessment information with a set of criteria that includes a contrast quality criterion; and generate, as a result of determining that the assessment information satisfies the set of criteria, result information indicating that the assessment information associated with the face image satisfies the set of criteria.

DETAILED DESCRIPTION

Figure 1:
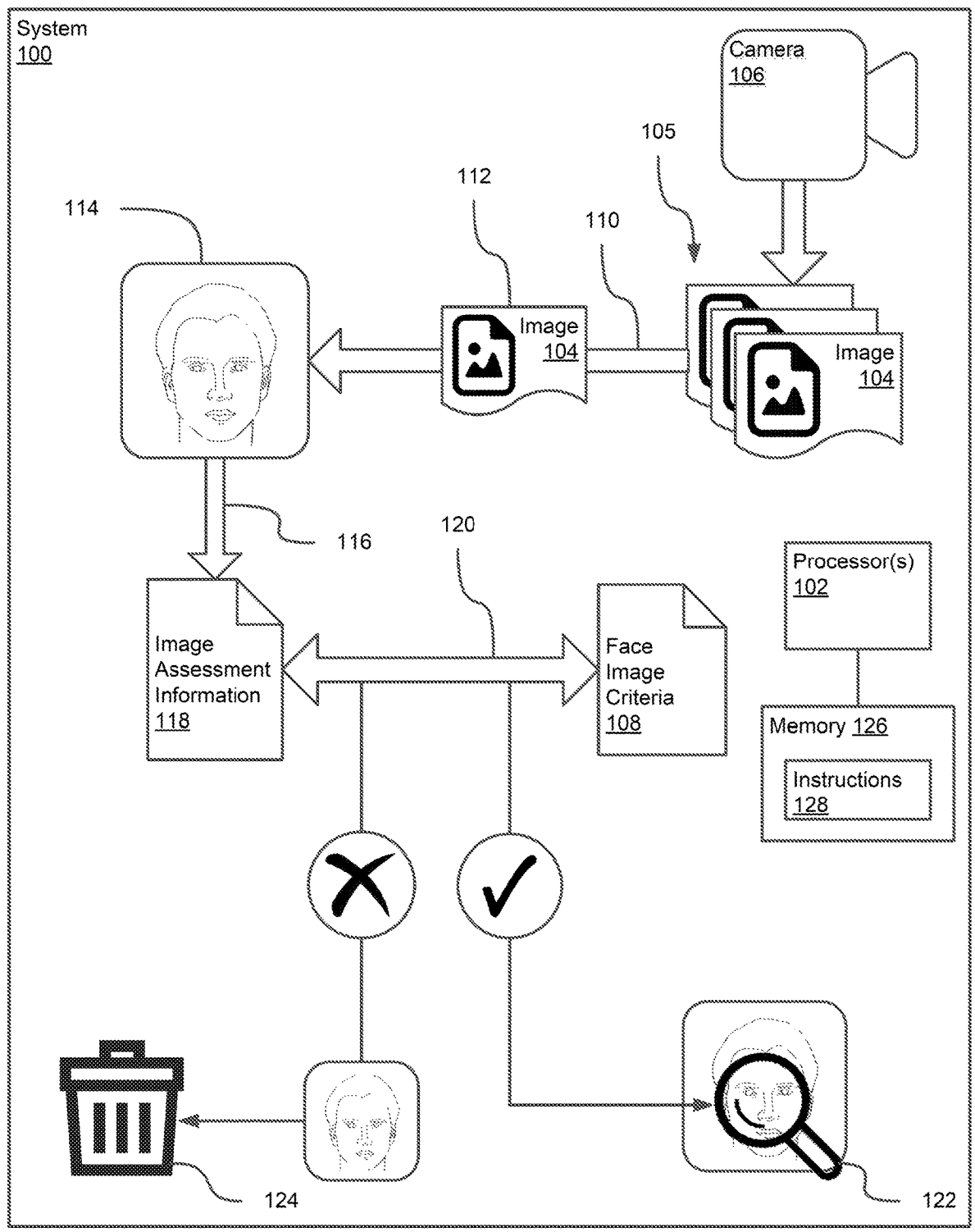
FIG. 1 shows a system for selecting, from a plurality of images, one or more subimages to be processed according to one or more embodiments.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances. Moreover, the term "subset," as used herein, refers to a collection of one or more members or instances that are collectively smaller in number than the set or plurality of which the subset is comprised. For instance, a subset of a set of ten items will include less than ten items and at least one item.

References to the term "module," as used herein, is to be construed as a collection of hardware configured to perform a set of particular computing functions within a system. The hardware of a module may include one or more processors that are specifically hardwired to perform one or more of the set of particular computing functions. A module may include a general purpose processor and memory storing a set of instructions that, as a result of execution by the general purpose processor, causes the module to perform one or more of the set of particular computing functions.

References to the term "subimage," as used herein, refers to a portion of a image. A subimage, for example, may be a collection of pixels taken from an image that comprise fewer pixels than the number of pixels of the entire image.

FIG. 1 shows a system 100 for selecting, from a plurality of images, one or more subimages to be processed according to one or more embodiments herein. The system 100 includes one or more processors 102 that cause the system 100 to perform one or more operations described herein. The system 100 receives a plurality of images 105 from a camera 106 and analyzes the plurality of images 105 to determine which, if any, face images 114 to select for use in connection with facial recognition operations. A face image 114 may be an entire image 104 that depicts a single face or may be a portion of an image 104 that depicts a single face and that is smaller than the entire image 104. In some instances, a face image 114 refers to an image 104 or subimage thereof identified by the system 100 as containing an image depicting a single human face.

The system 100 evaluates the plurality of images 105 and determines which, if any, of the face images contained in the plurality of images 105 satisfy face image criteria 108. Face images determined as satisfying the face image criteria 108 are subjected to further processing, which may include processes related to identification of a person shown in the face image. Because processes related to identification of a person (e.g., facial recognition) are resource intensive, determining face images that satisfy the face image criteria 108 helps to ensure that those face images having certain qualities correlated to a higher likelihood of identifying persons are processed for facial recognition. As a result, face images having less desirable qualities for face recognition are discarded, or at least not used for facial recognition, and the efficiency of resources directed to facial recognition processes may be improved.

A face detection process 110 is performed on the plurality of images 105 to identify a subset of images 112 (e.g., image 104) of the plurality of images 105 that include one or more face images. As part of or in connection with the face detection process 110, the system 100 may identify face images 114 from the subset of images 112 and perform a face image assessment 116 on each of the face images 114. In particular, the system 100 assesses each of the face images 114 based on a set of factors and generates image assessment information 118 for each of the face images 114 based on a result of the assessment. The face image 114 may be evaluated based on image characteristics as well as content of the face in the face image 114. The set of factors may include one or more of a size of the face image 114, a pose of a face in the face image 114, sharpness of the face image 114, and contrast quality of the face image 114.

The image assessment information 118 generated is evaluated based on face image criteria 108 to determine whether to advance the face image 114 for facial recognition processing 122. The face image criteria 108 includes a set of criteria corresponding to the aforementioned set of factors—namely, one or more of the size of the face image 114, the pose of the face in the face image 114, the sharpness of the face image 114, and the contrast quality of the face image 114. The set of criteria may specify a different threshold or condition corresponding to each of the set of factors. The system 100 compares 120 the information for each factor in the image assessment information 118 to the corresponding threshold or condition in the face image criteria 108. As a result of determining that the image assessment information 118 satisfies each of the set of criteria in the face image criteria 108, the system 100 advances the face image 114 for facial recognition processing 122. Advancing the face image 114 for facial recognition processing 122 may include storing the face image 114 in data storage for further processing, transmitting the face image 114 to another part of the system 100 or another system for facial recognition processing 122, or otherwise approving the face image 114 for facial recognition processing 122. On the other hand, as a result of determining that the image assessment information 118 fails to satisfy each of the set of criteria, the system 100 will not advance the face image 114 for facial recognition processing 122 and may instead eliminate 124 the face image 114 from consideration. Facial recognition processing 122 is described in further detail below.

The system 100 may process each face image 114 identified in the subset of images 112 to determine whether to perform facial recognition processing 122 thereon. For each face image 114 approved for facial recognition processing 122, the system 100 may store in persistent storage the data corresponding to the face image 114 and may optionally store the image assessment information 118 in association with the face image 114 data. Subsequent to evaluating all the face images 114 identified in an image 104 of the subset of images 112, the system 100 may discard the image 104 and obtain another image 104 of the subset of images 112 to evaluate. The plurality of images 105 correspond to a series of images taken sequentially over time. The plurality of images 105, for instance, may be a stream of video data, a video data object, or a collection of image data objects sequentially captured by the camera 106.

The system 100 may continue to obtain images 104 (e.g., from the camera 106, from another system) until a suitable face image 114 is identified for facial recognition processing 122 or until no more images 104 remain for processing. The system 100 may replace stored face image 114 with a face image 114 determined as having superior or better characteristics (e.g., sharpness, pose) than the stored face image 114. In some instances, the biometric signature of a face image 114 determined as having superior characteristics may be stored in place of or in addition to the stored biometric signature of the face image 114 having less desirable characteristics. As a result, the system 100 is configured to obtain better images and biometric signatures for comparison, thereby improving the accuracy of the system 100 over time. Further description of the process of obtaining better samples for comparison is described below with respect to FIG. 11.

The camera 106, from which the plurality of images 105 is obtained, is electrically communicatively coupled to the system 100 and provides the plurality of images 105 as an input to the system 100. The camera 106 may be directly coupled to the system 100 via a wired connection or may be remotely coupled to provide the plurality of images 105 to the system 100, for example, over a wired or wireless communication network. In some embodiments, a plurality of cameras 106 coupled to the system 100 may each provide a plurality of images 105 to the system 100. Although the plurality of images 105 are shown as being received from the camera 106, the plurality of images 105 may be received from a source other than the camera 106. For instance, the plurality of images 105 may be received over a network (e.g., local area network, wide area network) and/or via an intermediate device, such as a network router or a server. In some instances, the plurality of images 105 may be stored in memory at a first time and provided to the system 100 at a second time later than the first time.

In some embodiments, the one or more processors 102 are electrically communicatively coupled to memory 126 that stores a set of instructions 128 that, as a result of execution by the one or more processors 102, cause the system 100 to perform one or more operations described herein. In some embodiments, the one or more processors 102 may be a device having hardware specifically configured to perform at least some of the operations described herein. For instance, the one or more processors 102 may include application specific integrated circuits (ASICs), field programmable gate arrays (FPGAs), system-on-a-chip (SoC), or other specialized or customizable computing hardware hardwired to perform at least some of the operations described herein.

Figure 2:
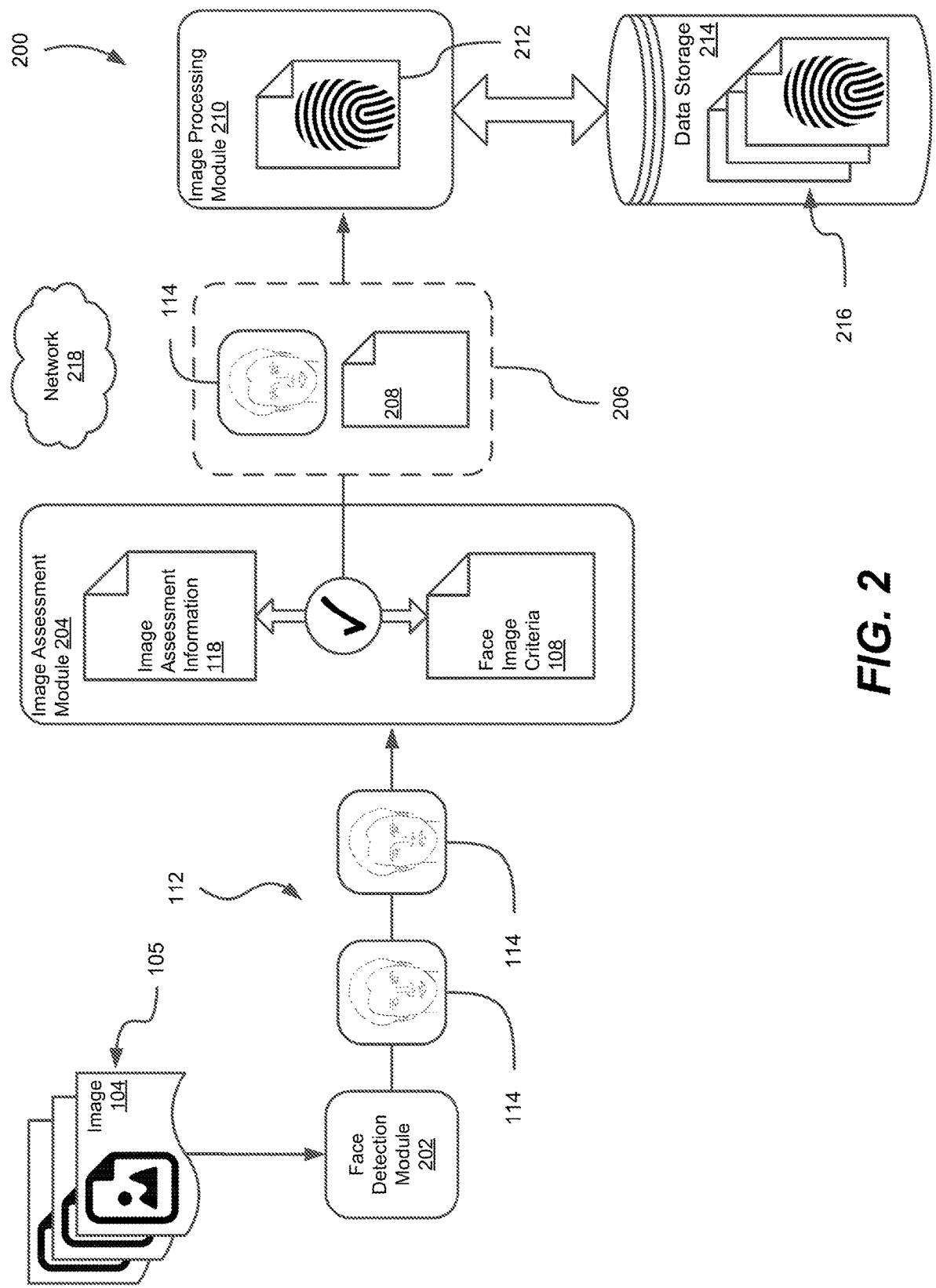
FIG. 2 shows an environment in which one or more images are evaluated to determine whether to perform facial recognition processing.

FIG. 2 shows an environment 200 in which one or more images 104 are evaluated by the system 100 to determine whether to perform facial recognition processing according to one or more embodiments described herein. The environment 200 includes a face detection module 202 that detects images of faces, also referred to as face images, in each of the plurality of images 105. The face detection module 202 receives the plurality of images 105 provided by the camera 106, processes each image 104 of the plurality of images 105, and identifies images 104 containing one or more face images 114 of persons. The face detection module 202 implements one or more algorithms for detecting facial features in the images 104. The face detection module 202 may, for instance, detect images of all or part of faces, such as images taken from the side that do not include both eyes of the subject. The face detection module 202 may detect the presence of a face in an image based on detecting a match between a group of pixels therein and attributes indicated as corresponding to human faces. The face detection module 202 may identify regions of pixels in each image 104 corresponding to a face.

The face detection module 202 may generate and provide output to an image assessment module 204 indicating that a face was detected in an image 104 received. The face detection module 202 may output the subset of images 112 containing at least one face image 114 to the image assessment module 204. In some embodiments, the face detection module 202 may indicate, to the image assessment module 204, which images 104 were detected as containing a face to the image assessment module 204 and information indicating one or more regions of pixels in the image 104 detected as containing the face. The image assessment module 204 may then extract each of the face images 114 from the regions of pixels identified for assessment. In some embodiments, the face detection module 202 may extract the groups of pixels detected as the face image 114, and send the extracted face images 114 to the image assessment module 204.

The image assessment module 204 receives or otherwise obtains the face images 114 indicated by the face detection module 202 and assesses the face images 114. For each face image 114, the image assessment module 204 generates image assessment information 118 regarding one or more of the set of factors discussed herein—the size of the face image 114, the pose of the face in the face image 114, the sharpness of the face image 114, and the contrast quality of the face image 114. The image assessment module 204 evaluates the image assessment information 118 using the face image criteria 108 to determine whether the face image 114 has attributes that justify subjecting the face image 114 to facial recognition processing 122.

If the image assessment module 204 determines that the image assessment information 118 for a particular face image 114 satisfies the face image criteria 118, the image assessment module 204 may generate an assessment output 206 that approves the face image 114 for facial recognition processing 122. The output 206 may include the face image 114 or may include information indicating a location (e.g., in memory, network location, database location) from which the face image 114 may be obtained. The output 206 may include result information 208 indicating various information related to the assessment performed. For instance, the result information 208 may include some or all of the image assessment information 118. The result information 208 may indicate information indicating a margin of satisfaction of the image assessment information 118 for each factor with respect to the face image criteria 108—for instance, numerical values indicating how much the image assessment information 118 exceeded each factor of the face image criteria 108. In some embodiments, the result information 208 may indicate one or more operations to be performed in the facial recognition processing 122 as a result of the assessment by the image assessment module 204. If the image assessment module 204 determines that the image assessment information 118 does not satisfy the face image criteria 108, the image assessment module 204 may discard the face image 114 and obtain another face image 114 for assessment. The image assessment module 204 may not generate or provide the output 206 for a face image 114 as a result of determining that the corresponding image assessment information 118 fails to satisfy the face image criteria 108.

As a result of receiving the output 206 from the image assessment module 204, an image processing module 210 may include performing facial recognition processing on the face image 114 in accordance with the output 206. Performing facial recognition processing by the image processing module 210 may include generating a biometric signature 212 of the face image 114, which can be used to determine an identity of the person depicted in the face image 114. In some embodiments, the biometric signature 212 is a face template having features corresponding to features of a subject's face. In some embodiments, the image processing module 210 may be part of a second system that is separate from the system 100. The second system, for example, may be separated from and connected to the system 100 by a network 218, such as a local area network or a wide area network.

The image processing module 210 may perform various operations involving the biometric signature 212 depending on the result info 208, which may include at least some of the image assessment information 118. For instance, the image processing module 210 may perform operations to determine an identity of the person in the face image 114 as a result of the image assessment information 118 satisfying a first set of thresholds specified in the face image criteria 108. The operations to determine the subject's identity may include comparing the biometric signature 212 with various previously-obtained stored biometric signatures 216 stored in data storage 214. The stored biometric signatures 216 may have a corresponding identity of a person associated therewith in the data storage 214. In some embodiments, an identity of a person may be a name or alphanumeric combination (e.g., username, employee identification number) associated with a person. An identity of a person may be information other than a name or alphanumeric combination in some embodiments. For example, an identity of a person may be information associated with a previous instance in which a face image 114 of a particular person was captured, such as information regarding time, date, location, etc. The system 100 may generate a unique alphanumeric value for the identity of the person and store the alphanumeric value in data storage 214.

As a result of determining that the biometric signature 212 is sufficiently similar to a stored biometric signature 216, the image processing module 210 may generate an output indicating the identity associated with the stored biometric signature 216. The image assessment information 118 for each of the stored biometric signatures 216 may be stored in the data storage 214 in association with the corresponding stored biometric signature 216. Moreover, each of the stored biometric signatures 216 may be associated with information indicating an identity of the person pictured in the corresponding face image 114 (if known) and may include information indicating a time and date on which the corresponding face image 114 was captured or stored.

The image processing module 210 may perform operations to update, in the data storage 214, the stored biometric signature 216 depending on the result info 208. In response to determining that the image assessment information 118 satisfies a second set of thresholds specified in the face image criteria 108, the image processing module 210 may cause the biometric signature 212 to be stored in the data storage 214. The image processing module 210 may associate the biometric signature 212 now stored in the data storage 214 with a subject's identity. A name or other alphanumeric identifier for a person may be associated with the biometric signature 212. In some instances, another one of the stored biometric signatures 216 may be disassociated with the identity such that the biometric signature 212 replaces an older stored biometric signature 216. In some instances, the biometric signature 212 may be merged with an identity such that a plurality of biometric signatures 216 are stored in the data storage 214 in association with a single identity.

The biometric signature 212 generated may include an array of values representative of a comparison between the face image 114 and a corresponding template stored in the memory 126. The biometric signature 212 may, for instance, represent differences in Euclidean distance between points in the face image 114 and points in the blank template. The stored template may include a multidimensional vector in Euclidean space. The memory 126 may store a plurality of templates that correspond to difference poses for face images 114 obtained. The instructions 128 (FIG. 1) may include instructions that cause the one or more processors 102 to implement an artificial intelligence model to generate the template. The artificial intelligence model may include deep neural network (DNN) models and principles in which multilayered neural networks learn to generate templates and/or biometric signatures based on stored data regarding templates and face images. The system 100 implements DNN technologies to identify relevant features in face images and generate corresponding templates and biometric signatures. The stored biometric signatures 216 may be generated in the same way as the biometric signature 212.

In some embodiments, the image assessment module 204 and the image processing module 210 may be part of the same system 100 and even part of the same device in some implementations. In some embodiments, the image assessment module 204 may send the output 206 over the communication network 218 to the image processing module 210. The network 218 may be a wide area network (e.g., internet) in which the image processing module 210 is remotely located to the image assessment module 204. In some embodiments, the network 218 may be a local area network.

Facial recognition can be a computationally intensive process; however, determining which face images 114 to process has been a complex and difficult challenge. The image processing module 210 performs facial recognition processing on select face images 114 that satisfy the face image criteria 118. This process of evaluating the face images 114 based on the set of factors identified herein helps to ensure that select face images 114 having characteristics suited to successfully recognize the identity of persons imaged are processed. Therefore, the image processing module 210 performs facial recognition processing on face images 114 most likely to achieve a worthwhile result, thereby improving the computational efficiency of the system 100.

Figure 3:
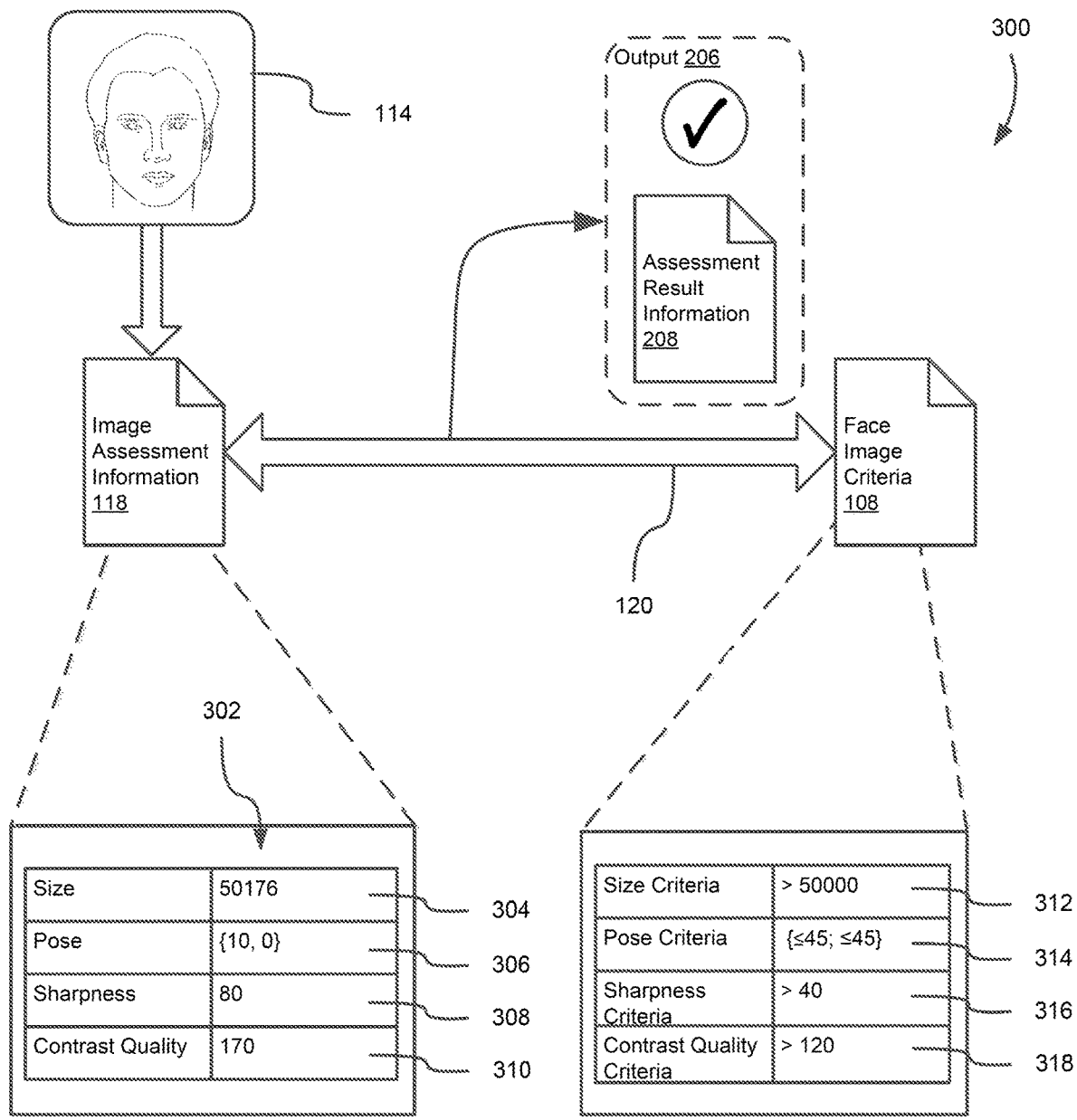
FIG. 3 shows an environment in which image assessment information is evaluated.

FIG. 3 shows an environment 300 in which image assessment information 118 is evaluated based on the face image criteria 108 according to one or more embodiments. The environment 300 shows operations performed by the image assessment module 204 in connection with the system 100. Image assessment information 118 is generated based on a face image 114 received from the face detection module 202. The image assessment information 118 includes a set of alphanumeric values 302 representative of various characteristics of the face image 114. The image assessment information 118 may be formatted as an array, such as a one-dimensional array in which the alphanumeric entries are separated by delimiters (e.g., semi-colon, comma, tab). The image assessment information 118 may be formatted as a multi-dimensional array or table having multiple columns and rows.

The image assessment information 118 includes size information 304 representative of a size of the face image 114. The size information 304 may specify a number of pixels contained in the face image 114, the width of the face image 114 (e.g., in pixels), a height of the face image 114 (e.g., in pixels), or an amount of data storage occupied by the face image. For example, the size information 304 in the environment 300 indicates that the face image 114 has 50176 pixels.

The image assessment information 118 includes pose information 306 representative of a pose of a person's face or head in the face image 114. The pose information 306 may indicate an orientation of the face relative to an optical axis of the camera 106 capturing the face image 114. The image assessment module 204 may generate the pose information 306 based on the features identified in the person's face and head in the face image 114. For instance, if the top of a person's head and a right eye of the subject are visible in the face image 114, the pose information 306 may indicate that the head is oriented downward and to the left of the optical axis of the camera 106. The pose information 306 may have a format indicating rotation about one or more axes. The pose information 306 shown, for example, indicates that the head in the face image 114 is rotated 10° about a vertical axis and 0° about a horizontal axis. In some embodiments, the pose information 306 may include alphanumeric values representative of various features that can be identified in the face image 114, which may correspond to rotational states of the head shown in the face image 114.

The image assessment information 118 also includes sharpness information 308 representative of the sharpness of the face image 114. Sharpness reflects a rate or quickness of change between boundaries of color or tone in the face image 114. The image assessment module 204 may generate the sharpness information 118 based on an operation involving a decimation operation, as described below. The sharpness information 308 may include an alphanumeric value indicating a sharpness level of the face image 114.

The image assessment information 118 also includes contrast quality information 310. Contrast quality is an assessment of the overall quality of contrast for the face image 114. The image assessment module 204 may generate the contrast quality information 310 based on evaluations of contrast in certain areas of a face in the face image 114. The contrast quality information 310 may include one or more alphanumeric values indicating the contrast quality of the face image 114.

The image assessment module 204 determines whether to advance the face image 114 for facial recognition processing as a result of the comparison 120 between the image assessment information 118 and the face image criteria 108. The face image criteria 108 may include one or more of size criteria 312, pose criteria 314, sharpness criteria 316, and contrast quality criteria 318. The face image criteria 108 may be formatted as a one-dimensional de-limiter separated array, or a multi-dimensional array, as described above with respect to the image assessment information 118. The face image criteria 108 may include Boolean logic, conditions, and/or relationships regarding corresponding information in the image assessment information 118.

In the environment 300, the size criteria 312 specify one or more acceptable size ranges or thresholds for the size information 304 of the face image 114. The size criteria 312, for example, may specify a minimum width for the face image 114, a minimum height for the face image 114, and/or a minimum total pixel count for the face image 114. The pose criteria 314 specify acceptable poses for the face imaged in the face image 114, as indicated by the pose information 306. By way of non-limiting example, the pose criteria 314 may include acceptable ranges for orientation of the head in the face image 114 or acceptable groups of facial features represented in the face image 114. The sharpness criteria 316 specify one or more acceptable sharpness ranges or thresholds for the sharpness information 308 of the face image 114. The contrast quality criteria 318 specify one or more acceptable contrast quality ranges or thresholds for the contrast quality 310 of the face image 114. In some embodiments, some of the face image criteria 108 may be dependent upon the image assessment information 118. For example, if the pose information 306 is within a first set of ranges, the face image criteria 108 may specify corresponding set of size criteria 312, sharpness criteria 316, and/or contrast quality criteria 318.

The image assessment module 204 performs comparisons between the values 302 for the image assessment information 118 and corresponding criteria in the face image criteria 108. As a result of determining that the image assessment information 118 satisfies the face image criteria 108, the image assessment module 204 may generate the output 206 advancing the face image 114 for facial recognition processing. The output 206 may include an indication that the face image 114 is satisfactory and may include the face image 114 or a reference to a location where the face image 114 may be obtained. The output 206 may include the assessment result information 208, which may include at least some of the image assessment information 118 or information related thereto. As a result of receiving the output 206, the image processing module 210 may perform various facial recognition processing 122 using the face image 114.

The output 206 generated may be based at least in part on the face image criteria 108, which may include information, such as a classification, to be generated based on the values 302 of the image assessment information 118. The face image criteria 108 may specify that the assessment output 206 should include a classifier corresponding to an operation to be performed if the values 302 fall within certain ranges. For instance, as a result of the values 302 falling within a first range specified in the face image criteria 108, the image assessment module 204 would generate an output 206 that includes first information that would cause the image processing module 210 to attempt to recognize the face in the face image 114. As a result of the values 302 falling within a second range specified in the face image criteria 108, the image assessment module 204 would generate an output 206 that includes second information that would cause the image processing module 210 to attempt to store the biometric signature 212 for the face image 114 as a new stored biometric signature 216 for future facial recognition.

Figure 4:
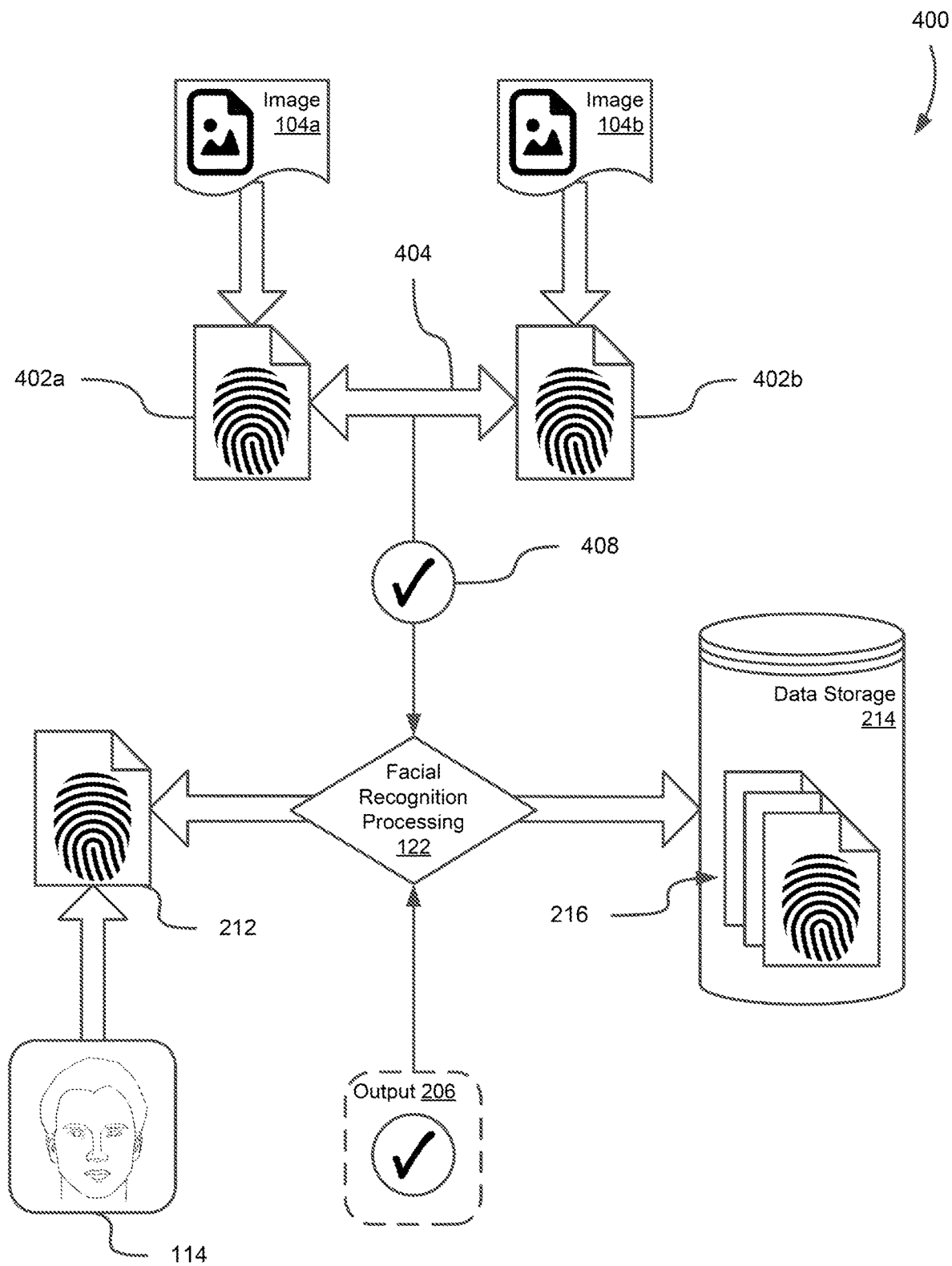
FIG. 4 shows an environment in which the consistency of one or more images is verified.

FIG. 4 shows an environment 400 in which the system 100 verifies consistency of the images 104 obtained according to one or more embodiments. The system 100 evaluates the images 104 obtained to help ensure that an inconsistent or unrepresentative image 104 is not used for facial recognition purposes. For instance, if there is a significant amount of motion during the image capture or there is cigarette smoke passing through the image, these occurrences may result in a biometric signature 212 that is not adequately representative of the subject. Therefore, using the biometric signature 212 in such a situation could lead to inaccurate facial recognition results and waste resources. The system 100 verifies consistency of images obtained before proceeding to perform facial recognition processing 122. Aspects of the environment 400 may be performed by the image assessment module 204 and/or the image processing module 210.

The environment 400 involves obtaining a plurality of images 105 sequentially captured by the camera 106 over time, as described herein with respect to FIG. 1. The camera 106 may capture at least a first image 104a and a second image 104b sequential to the first image 104a for consistency verification. The plurality of images 105 obtained are not necessarily immediately sequential—for example, a time period (e.g., 10 milliseconds, 1 second, 2 seconds) may separate first time at which the first image 104a is captured and a second time at which the second image 104b is captured. In some instances, there may be one or more images captured between the first image 104a and the second image 104b.

One of the images 104a and 104b may contain the face image 114 that the system 100 is evaluating for facial recognition processing 122. Although only two images 104a and 104b are depicted and described, the system 100 may evaluate more than two images 104 in connection with image consistency verification. In some embodiments, the signatures 402 obtained may be of particular portions or subimages of the images 104. For instance, the signature 402a may be of a portion of the image 104a detected as being a face image 114 and the signature 402b may be of a corresponding portion of the image 104b. In some embodiments, the signature 402a may be the biometric signature 212 of the face image 114 of a face captured at a first time, and the signature 402b may be a biometric signature of the face image 114 of the face captured at a second time after the first time. Signatures 402 are generated that each corresponds to one of the images 104. Generation of the signatures 402a and 402b may be performed according to the process discussed for generating biometric signatures 212 herein.

The system 100 may perform a comparison 404 between the first signature 402a and the second signature 402b to determine consistency between the signatures. The signatures 402a and 402b may be represented as respective arrays of values corresponding to multidimensional vectors in Euclidean space. The system 100 may determine differentials between corresponding values in arrays to the signatures 402a and 402b to determine how consistent the images 104a and 104b are with each other. The system 100 may compare 404 the differentials with one or more thresholds or ranges and determine that the images 104a and 104b are within an acceptable range of consistency. If the signatures 402a and 402b are determined to be sufficiently similar or close in vector space, an output 408 is generated indicating that the images 104a and 104b are verified as consistent. If the signatures 402a and 402b are insufficiently similar, the system 100 may not generate the output 408 or generate an output disapproving facial recognition processing 122 for the face image 114. In some embodiments, the system 100 may consider more than two sequential images 104 or subimages in the consistency verification of the environment 400. For example, the system 100 may verify that three signatures 402 corresponding to three sequential images 104 are sufficiently similar as a condition precedent to issuing the output 408.

In some embodiments, the system 100 may perform the facial recognition processing 122 as a result of generating both the output 408 verifying image consistency and the output 206 verifying that the image assessment information 118 satisfies the face image criteria 108 set of performing facial recognition processing 122. Once the consistency of the images 104 and the quality of the face image 114 are verified, the system 100 may perform the facial recognition processing 122 in accordance with the output 206, as discussed herein. The system 100 may, for example, determine an identity of the person depicted in the face image 114 or store the face image 114 in the data storage 214 as one of the stored biometric signatures 216. The efficiency and reliability of the system 100 for performing facial recognition processing 122 may be improved by processing certain face images 114 of sufficiently high quality and consistency.

Figure 5:
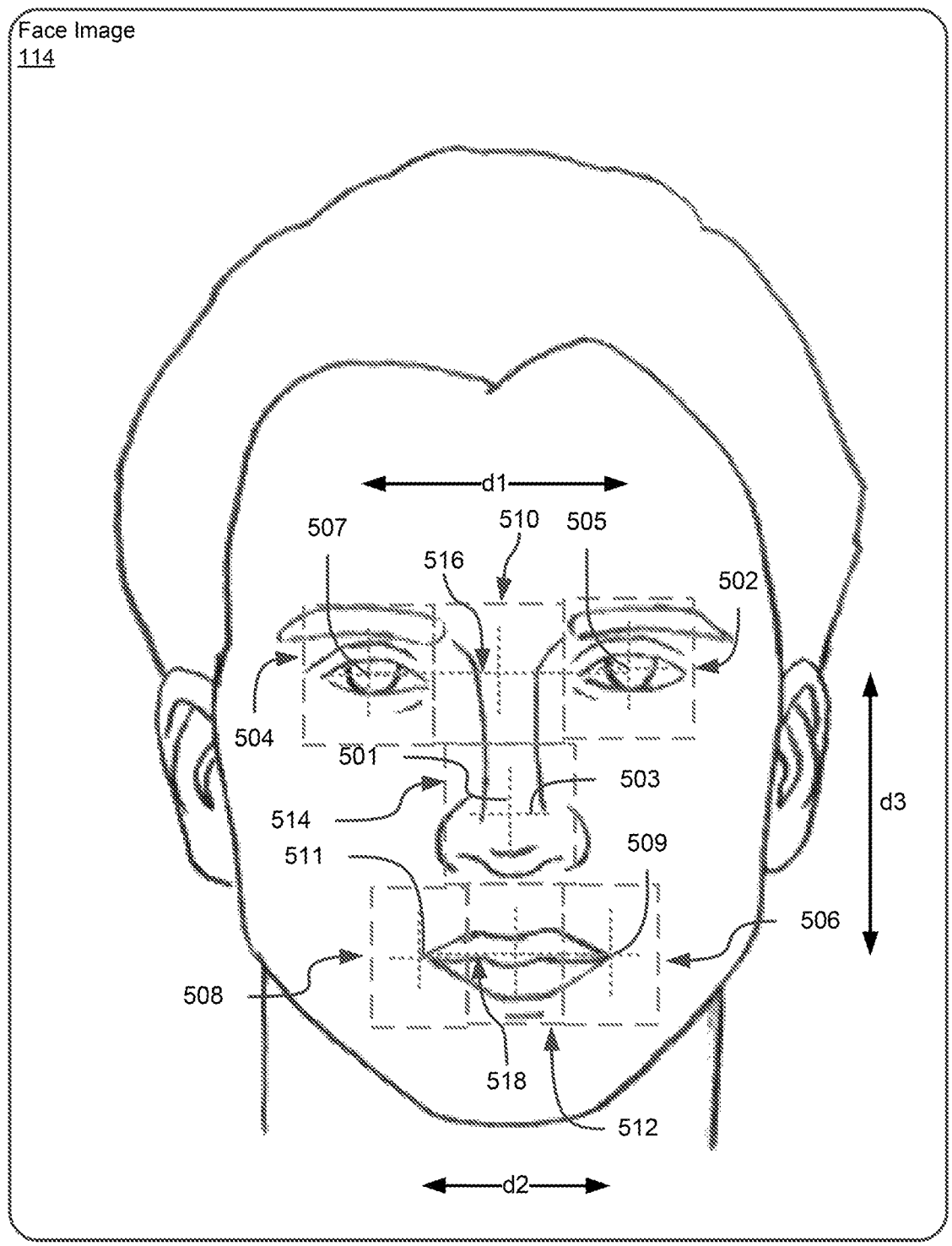
FIG. 5 shows a diagram of a plurality of regions generated for a face image.

FIG. 5 shows a diagram 500 of a plurality of regions of the face image 114 according to one or more embodiments. The diagram 500 is generated by the system in connection with generating the contrast quality information 310. The system 100 identifies a plurality of particular features of the face in the face image 114 and determines a plurality of regions in the face image 114 respectively centered about the particular features of the face in the face image 114. The system 100 may generate or identify, for each region, a vertical axis 501 and a horizontal axis 503 that are each centered within a region.

The system 100 identifies pupil centers of the left and right eyes in the face image 114 and determines a first region 502 centered on a left pupil 505 and a second region 504 centered on a right pupil 507. The system 100 also identifies a left mouth corner 509 and a right mouth corner 511 in the face image 114 and determines a third region 506 centered around the left mouth corner 509 and a fourth region 508 centered on the right mouth corner 511. The system 100 may also determine a fifth region 510 between the first region 502 and the second region 504 and a sixth region 512 between the third region 506 and the fourth region 508. The system 100 may further determine a seventh region 514 between the fifth region 510 and the sixth region 512. The system 100 may also determine a first horizontal line 516 extending between the vertical axis 501 centered on the left pupil and the vertical axis 501 centered on the right pupil. The system 100 may also determine a second horizontal line 518 extending between the vertical axis 501 centered on the left mouth corner 507 and the vertical axis 501 centered on the right mouth corner 509. In some instances, features in the face image 114, such as the left and right pupils or the left and right mouth corners, may not be horizontally aligned (i.e., located at different vertical positions). In such instances, the first horizontal line 516 or the second horizontal line 518 may be positioned halfway between the offset facial features.

The sizes of each of the plurality of regions may be based on distances between the particular features of the face image 114 identified. A width of at least some of the regions may be based on a first distance d1 between the left pupil center and the right pupil center. The first distance d1 may be a distance in a horizontal direction parallel to horizontal axis of the face image 114. A width of at least some of the regions may be based on a second distance d2 between the left mouth corner and the right mouth corner. The second distance d2 may be a distance in a horizontal direction parallel to the horizontal axis of the face image 114. A height of at least some of the regions may be based on a third distance d3 between the mouth and the eyes. The distance d3 may be a distance between a center horizontal axis of the fifth region 510 and a center horizontal axis of the sixth region 512.

In some instances, there may be more or fewer than seven regions. For instance, if a single eye is not visible in the face image 114, the system 100 may decide not to determine the region corresponding to the other non-visible eye. As a result, the sizes of the regions may be determined in a different manner. If the right eye is not visible, for example, a horizontal size of the first region 502 may be determined as the distance between the center of the left pupil to a bridge portion of the nose in the face image 114. As a result of determining the plurality of regions, the system 100 may use the plurality of regions to generate the contrast quality information 310.

Figure 6:
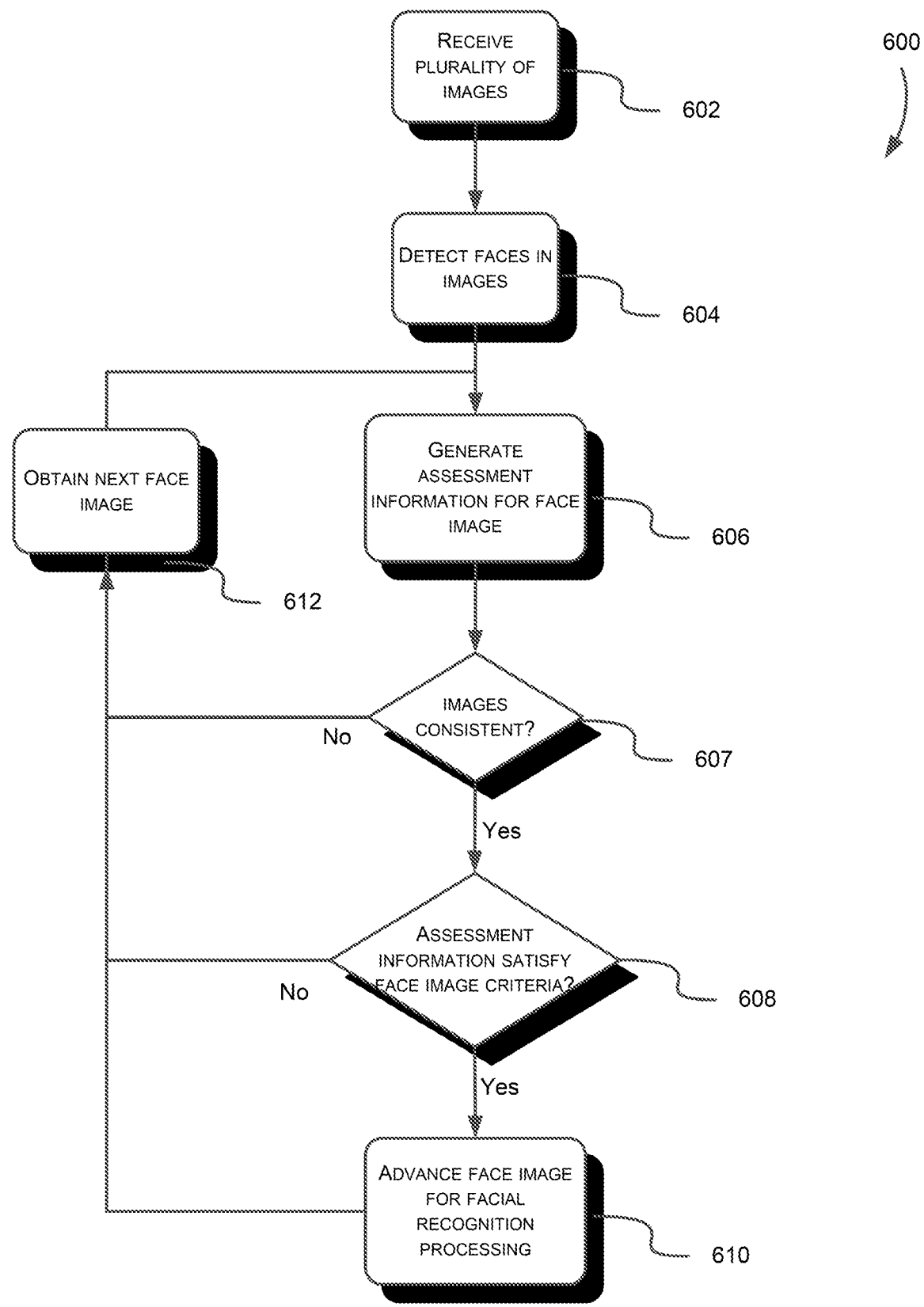
FIG. 6 shows a method for evaluating a plurality of images for facial recognition processing.

FIG. 6 shows a method 600 for evaluating a plurality of images for facial recognition processing according to one or more embodiments. The method 600 is performed by one or more components of the system 100, such as the image assessment module 204 and the face detection module 202. The method 600 begins by receiving 602 a plurality of images 105. The plurality of images 105 are generated by the camera 106 and may be received therefrom or over a network. Next, the system 100 detects 604 faces in one or more of the images 104. For example, the system 100 may detect, in the one or more images, a set of facial features qualifying as a face image 114. Detecting 604 the faces may include, for each image 104 detected as including a face image 114, identifying a region in the image 104 containing the face and generating information useable to process the face image 114. The system 100 may identify a set of coordinates corresponding to the region containing the face image 114, or extract information representative of the face image 114 for further processing. If no faces are detected in the plurality of images 105, the system 100 may wait to receive 602 another plurality of images 105.

The system 100 then proceeds to generate 606 assessment information 118 for each face image 114 detected in the plurality of images 105. Generating 606 the assessment information 118 includes generating the size information 304, the pose information 306, the sharpness information 308, and the contrast quality information 310, as described herein.

The method 600, in some embodiments, may include determining 607 whether the images 104 received are consistent. For instance, the system 100 may generate a biometric signature 212 of the face image 114 in a first image 104 of the plurality of images 105 received and generate a biometric signature 212 of the face image 114 in a second image 104 that is sequential to the first image 104 in the plurality of images 105. The system 100 may compare the first and second biometric signatures 212 to determine whether they are sufficiently similar. If so, the method 600 may proceed; otherwise, the method 600 may return to a previous operation, such as by obtaining 612 a next face image 114. In some embodiments, the system 100 may determine consistency of a first image 104 and a second image 104 sequential to the first image 104 in the plurality of images 105 received prior to generating 606 assessment information 118 for face images 114 detected. In some embodiments, determining 607 whether the face images 114 are consistent may not be performed. Further description of the determination 607 is described below with respect to FIG. 12 and elsewhere herein.

Thereafter, the assessment information 118 is compared with the face image criteria 108 and the system 100 determines 608 whether the assessment information 118 satisfies the face image criteria 108. Determining 608 whether the assessment information 118 satisfies the face image criteria 108 may include one or more of a comparison of the size information 304 with the size criteria 312, a comparison of the pose information 306 with the pose criteria 314, a comparison of the sharpness information 308 with the sharpness criteria 316, and a comparison of the contrast quality information 310 with the contrast quality criteria 318.

If, on the other hand, it is determined that the assessment information 118 does not satisfy the face image criteria 108, the method 600 proceeds by obtaining 612 the next face image 114 for evaluation. If no more face images 114 remain for processing, the system 100 waits to receive further images 104 for evaluation.

As a result of determining 608 that the assessment information 118 satisfies the face image criteria 108, the method proceeds by advancing 610 the face image 114 corresponding to the assessment information 118 for facial recognition processing. By determining 608 whether the assessment information 118 satisfies the face image criteria 108 before performing facial recognition processing, the system 100 obviates unnecessary expenditure of potentially expensive computational resources, storage, or network bandwidth on face images 114 that have undesirable characteristics for facial recognition processing. Advancing 610 the face image 114 for facial recognition processing causes the system 100 to compare the biometric signature 212 of the face image 114 with stored biometric signatures 216 in the data storage 214. For instance, facial recognition processing may include determining whether the biometric signature 212 is a match for a stored biometric signature or whether the biometric signature 212 corresponds to a new identity that the system 100 should learn. Further description of facial recognition processing is described herein with respect to FIG. 11 and elsewhere herein. The system 100 may return information indicating an identity of a person depicted in the face image 114 evaluated as a result of the face image processing.

Figure 7:
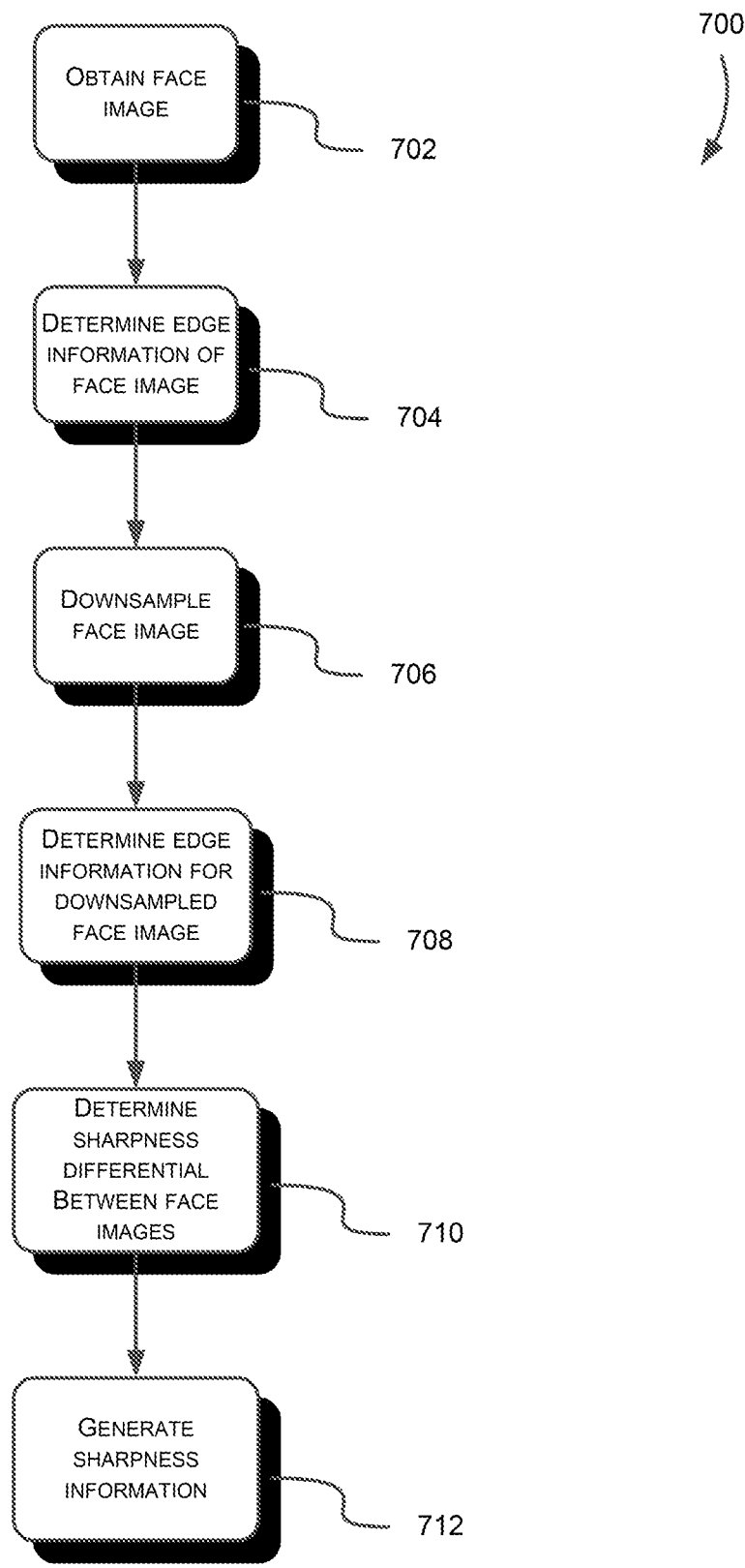
FIG. 7 shows a method for generating sharpness information regarding the face image.

FIG. 7 shows a method 700 involved in generating the sharpness information 308 according to one or more embodiments. The method 700 may be performed by the image assessment module 204 of the system 100. The method 700 is performed in connection with generating 606 the assessment information 118 of the method 600 and as described elsewhere herein. The method 700 begins by obtaining a face image 114 from an image 104, which may involve extracting or copying information representative of a region detected as including a face in the image 104. The face image 114 obtained 702 is stored in memory of the system 100 (e.g., random-access memory) for sharpness evaluation.

Next, the method 700 includes determining 704 edge information of the face image 114 obtained. Edge information indicates a sharpness of transition at boundaries between different colors, tones, etc., in the face image 114. The edge information may include an array containing numerical values representative of differences in color, tone, etc., between adjacent or nearby pixels of the face image 114. The array may be a one-dimensional array or multi-dimensional array including entries separated by delimiters (e.g., semi-colon, tab, comma). Higher numerical values may indicate a sharper transition in characteristics of adjacent or nearby pixels whereas a lower numerical value may indicate a relatively less sharp transition. The edge information may be generated, for example, by processes including performing a Fourier transform (e.g., Fast Fourier Transform, Discrete Fourier Transform) on the face image, application of a Sobel filter, or any such appropriate an edge detection algorithm.

The method 700 includes downsampling 706 the face image 114 to generate a downsampled version of the face image 114. Downsampling 706 may involve taking a first pixel from the face image 114 and then every Nth pixel (where N is an integer value) thereafter until there are no more pixels remaining to sample in the face image 114. One example of downsampling 706 is by performing a decimation operation in which the sample rate of the face image 114 is reduced by an integer factor. Downsampling 706 may also include application of a finite impulse response filter or Chebyshev filter on the face image 114. As a result of downsampling 706 the face image 114, a downsampled face image is obtained. At 708, the method 700 includes determining edge information for the downsampled face image in a manner similar to determining 704 the edge information of the face image 114.

Next, the method 700 includes determining 710 a sharpness differential between edge information for the face image 114 and the edge information for the decimated face image. Determining 710 the sharpness differential may include determining differences between values in the edge information for the face image 114 and corresponding values in the downsampled face image. The system 100 may determine a maximum or average value for a portion of the edge information corresponding to a particular subregion of the face image 114, and compare that value with a portion of edge information of a corresponding subregion of the decimated face image. The system 100 may compute edge information differences for subregions of the entire face image 114 and generate sharpness information corresponding to the differences in the edge information. Larger values for the sharpness information 308 may indicate that the face image 114 has relatively high sharpness, which is favorable for proper evaluation of a biometric signature 212 of the face image 114. Conversely, lower values for the sharpness information 308 may indicate that the face image 114 has relatively lower sharpness, which is unfavorable for proper evaluation of the face image 114.

Figure 8:
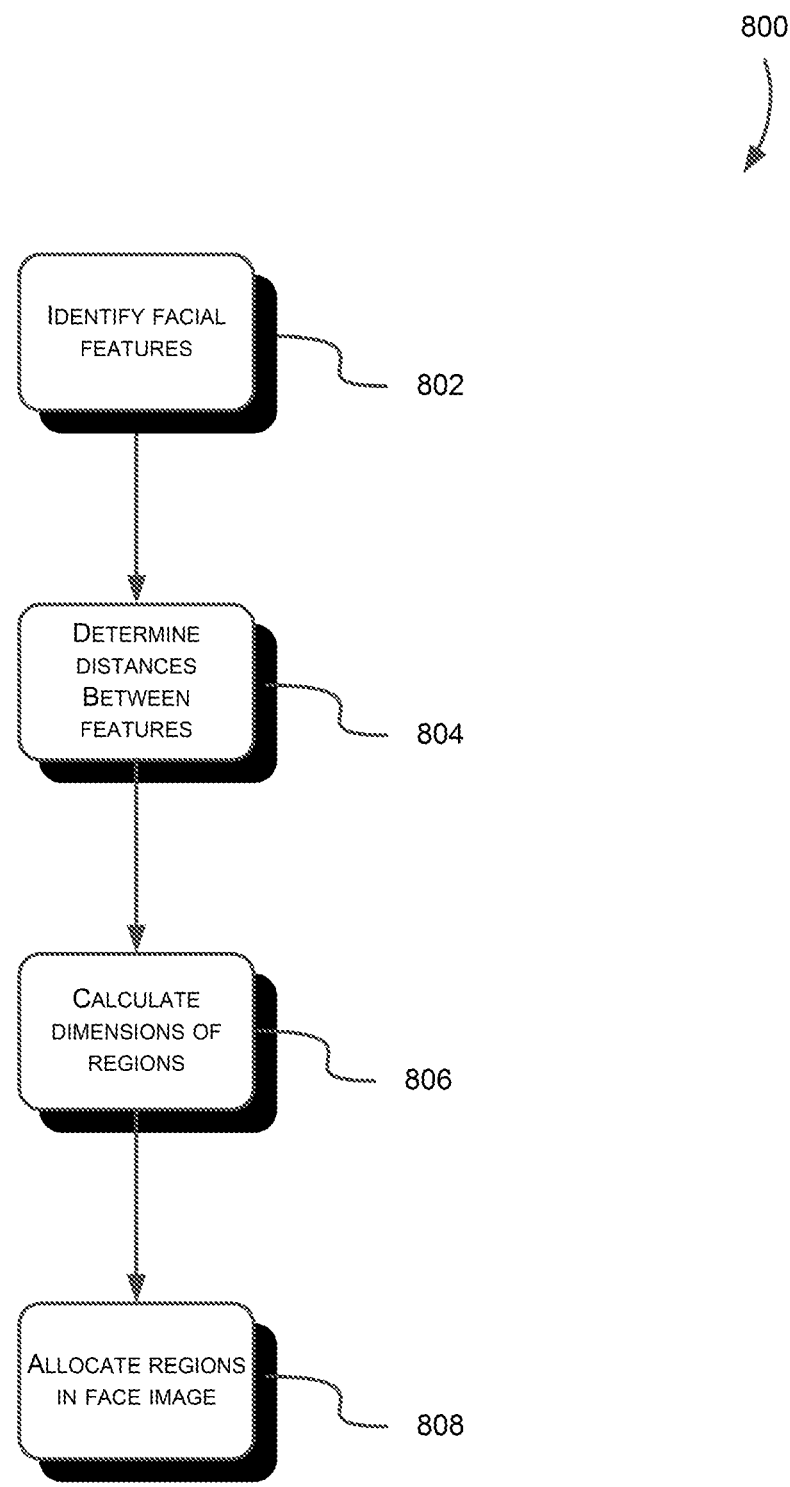
FIG. 8 shows a method for determining a plurality of regions in the face image.

FIG. 8 shows a method 800 involved in generating contrast quality information 310 according to one or more embodiments. The method 800 may be performed by the image assessment module 204. The method 800 is performed in connection with generating 606 the assessment information 118 of the method 600 and as described elsewhere herein. The method 800 begins by identifying 802 facial features in the face image 114 being evaluated. The system 100 analyzes the face image 114 and identifies which, if any, of a set of defined facial features are present in the face image 114. The system 100 may identify regions, e.g., by pixel coordinates or locations, in the face image 114 that correspond to the facial features identified. The system 100 may then generate information identifying the types of facial feature (e.g., eye, nose, mouth) and the region corresponding to each facial feature. The information regarding the facial features may identify locations of particular portions of the facial features, such as locations of pupil centers and locations of mouth corners.

Next, the system determines 804 distances between the facial features identified in 802. Determining 804 the distances may involve determining the distance d1 between pupil centers in the face image 114 and a distance d2 between corners of the mouth, as shown in FIG. 5. The distances d1 and d2 may be distances in directions parallel to a horizontal axis of the face image 114. That is, the distance d1 may be a distance between a vertical axis extending vertically through the left pupil center in the face image 114 and a vertical axis extending vertically through the right pupil center in the face image 114. The distance d2 may be a distance between a vertical axis extending vertically through the left mouth corner in the face image 114 and a vertical axis extending vertically through the right mouth corner in the face image 114. Determining 804 distances between facial features may also include determining a distance d3 between the eyes and the mouth in the face image 114. In particular, the distance d3 is determined between the first horizontal line 516 extending between the eye regions and the second horizontal line 518 extending between the mouth corner regions.

The method 800 then proceeds to determining 806 dimensions of regions that are to be allocated for and relative to the facial features of the face image 114. In particular, the system 100 determines dimensions of the regions 502, 504, 506, 508, 510, 512, and 514 (collectively "the regions"). The regions to be determined are rectangular in shape, and dimensions of each of the regions are calculated based on the distances d1, d2, and d3. Each of the first region 502, the second region 504, the fifth region 510, and the seventh region 514 may have a width (i.e., in the horizontal direction) equal to half the distance d1—that is a width of (d1)/2. Each of the third region 506, the fourth region 508, and the sixth region 512 may have a width equal to half the distance d2—that is, a width of (d2)/2. Each of the regions 502, 504, 506, 508, 510, 512, and 514 has a height (i.e., in the vertical direction) equal to half the distance d3—that is, a height of (d3)/2. In some instances, however, the dimensions of some or all of the regions may be different. For example, for a face image 114 in which only a single mouth corner or single pupil is visible, the width of some regions may be based on distances to other facial features, such as a bridge of the nose.

At 808 of the method 800, the system allocates 808 the regions in the face image 114 around or relative to facial features. The system 100 allocates the first region 502 centered on the left pupil center, the second region 504 centered on the right pupil center, the third region 506 on the left mouth corner, and the fourth region 508 at the right mouth corner. The fifth region 510 is allocated to have a vertical center axis 520 thereof vertically centered along the first horizontal line 516 with the right edge of the fifth region 510 positioned at or on the left edge of the first region 502 and the left edge of the fifth region 510 positioned at or on the right edge of the second region 504. The sixth region 512 is allocated to have a vertical center axis 522 thereof vertically centered along the second horizontal line 518 with the right edge of the sixth region 512 positioned at or on the left edge of the third region 506 and the left edge of the sixth region 512 positioned at or on the right edge of the fourth region 508. The seventh region 514 is allocated to be positioned between the fifth region 510 and the sixth region 512 with an upper edge positioned at or on the lower edge of the fifth region 510 and a lower edge positioned at or on the upper edge of the sixth region 512. The seventh region 514 is further allocated to have a vertical center axis 501 positioned halfway, in the horizontal direction, between the vertical axis 501 of the fifth region 510 and the vertical axis 501 of the sixth region 512. At the conclusion of the method 800, the system 100 proceeds to determine the contrast quality information 310 for the regions.

Figure 9:
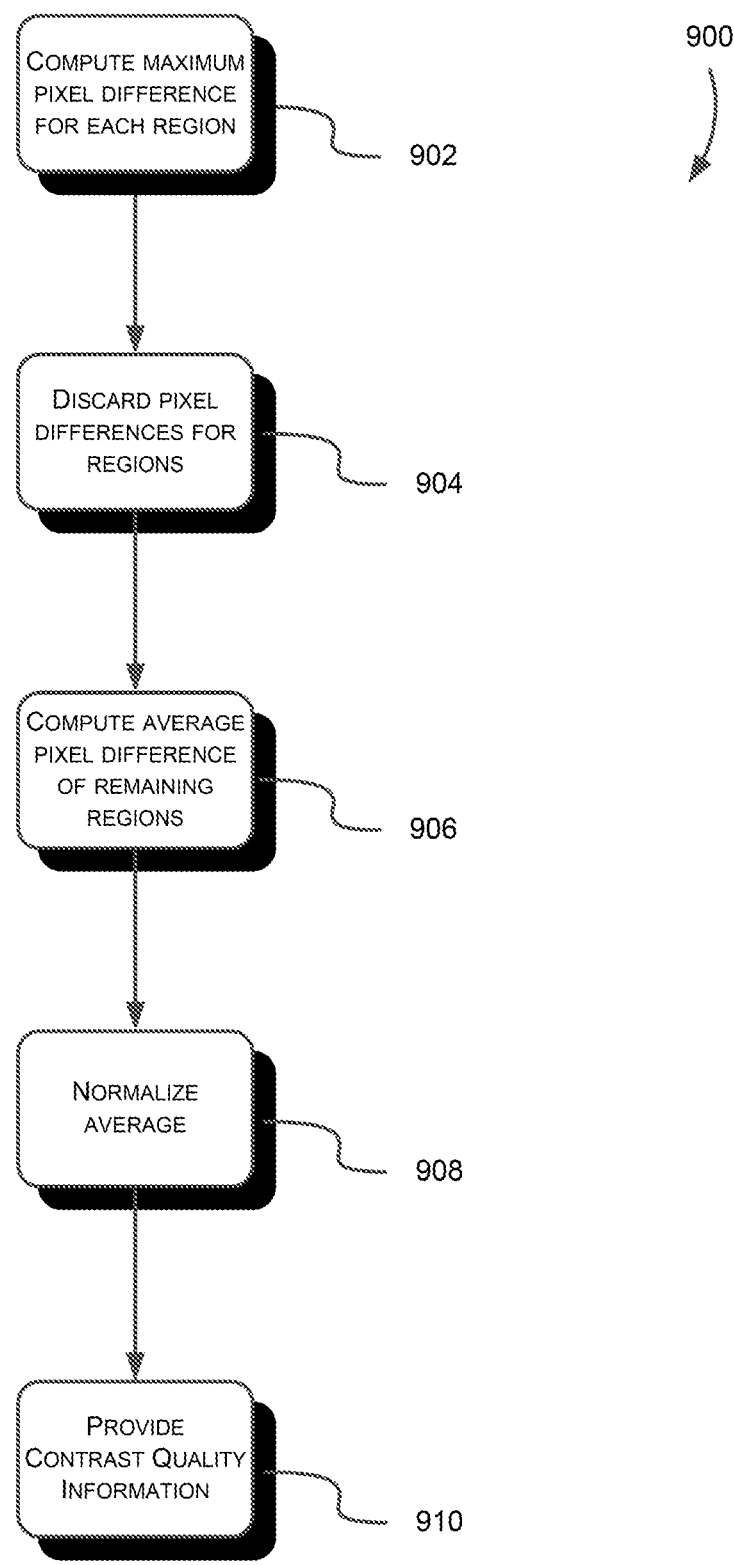
FIG. 9 shows a method for generating contrast quality information regarding the face image.

FIG. 9 shows a method 900 for determining the contrast quality information 310 for the regions allocated in the method 800. The method 900 may be performed by the image assessment module 204. The method 900 is performed in connection with generating 606 the assessment information 118 of the method 600 and as described elsewhere herein. The method 900 begins by computing 902 maximum differences between pixel values for pixels in each of the regions 502, 504, 506, 508, 510, 512, and 514. The pixel value for a pixel corresponds to an alphanumeric value representing the brightness of the pixel. The maximum difference between pixel values is computed by obtaining, for each region, a minimum pixel value and a maximum pixel value and determining the difference between the maximum pixel value and the minimum pixel value.

The method 900 proceeds by discarding 904 the maximum pixel difference for one or more regions. In particular, the system 100 may include a defined number of regions for which to determine the contrast quality information 310. In some embodiments, the defined number of regions may be five. The system 100 discards 904 the maximum pixel differences for the regions having the lowest pixel differences to reach the defined number. In this example, the system 100 discards the lowest two maximum pixel differences to reach five maximum pixel differences. In some instances, the defined number of maximum pixel differences to discard may change according to other information. For instance, if the pose information 306 indicates that the face in the face image 114 has certain orientations (e.g., face is looking 45° to one side), the number of maximum pixel differences to discard may be fewer than five.

The method 900 includes computing 906 an average pixel difference of the remaining regions. That is, the system 100 computes an average maximum pixel difference for the regions 502, 504, 506, 508, 510, 512, and 514 that were not discarded in 904. Computing 906 the average pixel difference may include computing a sum of the maximum pixel differences for the regions 502, 504, 506, 508, 510, 512, and 514 that were not discarded in 904.

Figure 13:
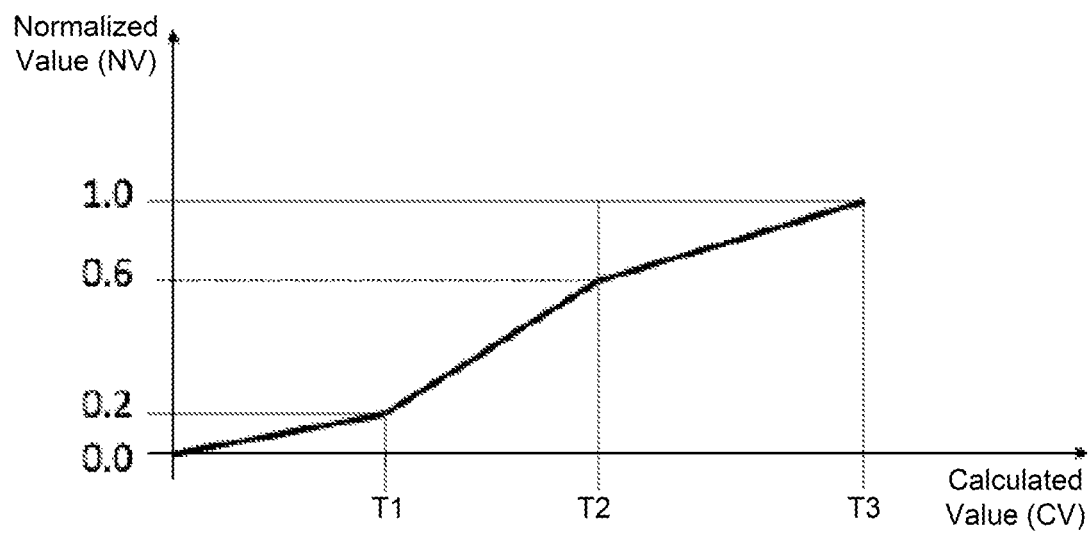
FIG. 13 shows a graphical representation representing a relationship of calculated values for contrast quality and normalized values for contrast quality.

The method 900 may then proceed to normalizing 908 the average maximum pixel difference computed in 906. Normalizing 908 may involve determining into which of a plurality of ranges the average maximum pixel difference falls, and calculating a corresponding normalized value based on the range determined. FIG. 13 shows a graph representing ranges for the calculated average maximum pixel difference values and corresponding normalized values on a 0.0 to 1.0 scale. The system 100 determines which range the calculated value (CV) falls into from less than T1, T1 to T2, T2 to T3, or greater than T3. Subsequent to determining into which range the calculated value falls, the system may calculate a corresponding normalized value (NV) using a formula for the range. The formula for each range may be as follows:

If $CV<T1$, then $NV=CV/(T1\times 0.2)$;

If $T1 \leq CV<T2$, then $NV=0.2+(CV-T1)/(T2-T1)\times 0.4$;

If $CV \geq T2$, then $NV=0.6+(CV-T2)/(T3-T2)\times 0.4$

The resulting normalized value (NV) is a unitless value from 0.0 to 1.0. The normalized average maximum pixel difference value and/or the calculated average maximum pixel difference value may be included in the assessment information 118. In some embodiments, the system 100 may determine a category or classification for the calculated average maximum pixel difference value instead of determining a normalized average maximum pixel difference value. For example, the system 100 may classify a calculated average maximum pixel difference value between T1 and T2 as being sufficient to recognize an identity of a person in a face image 114 and classify a calculated average maximum pixel difference value greater than T2 as being sufficient to learn or update an identity of the person in the face image 114. As a result of normalizing 908 the calculated value, the method 900 includes providing 910 contrast quality information 310 corresponding to the average pixel difference value computed.

Figure 10:
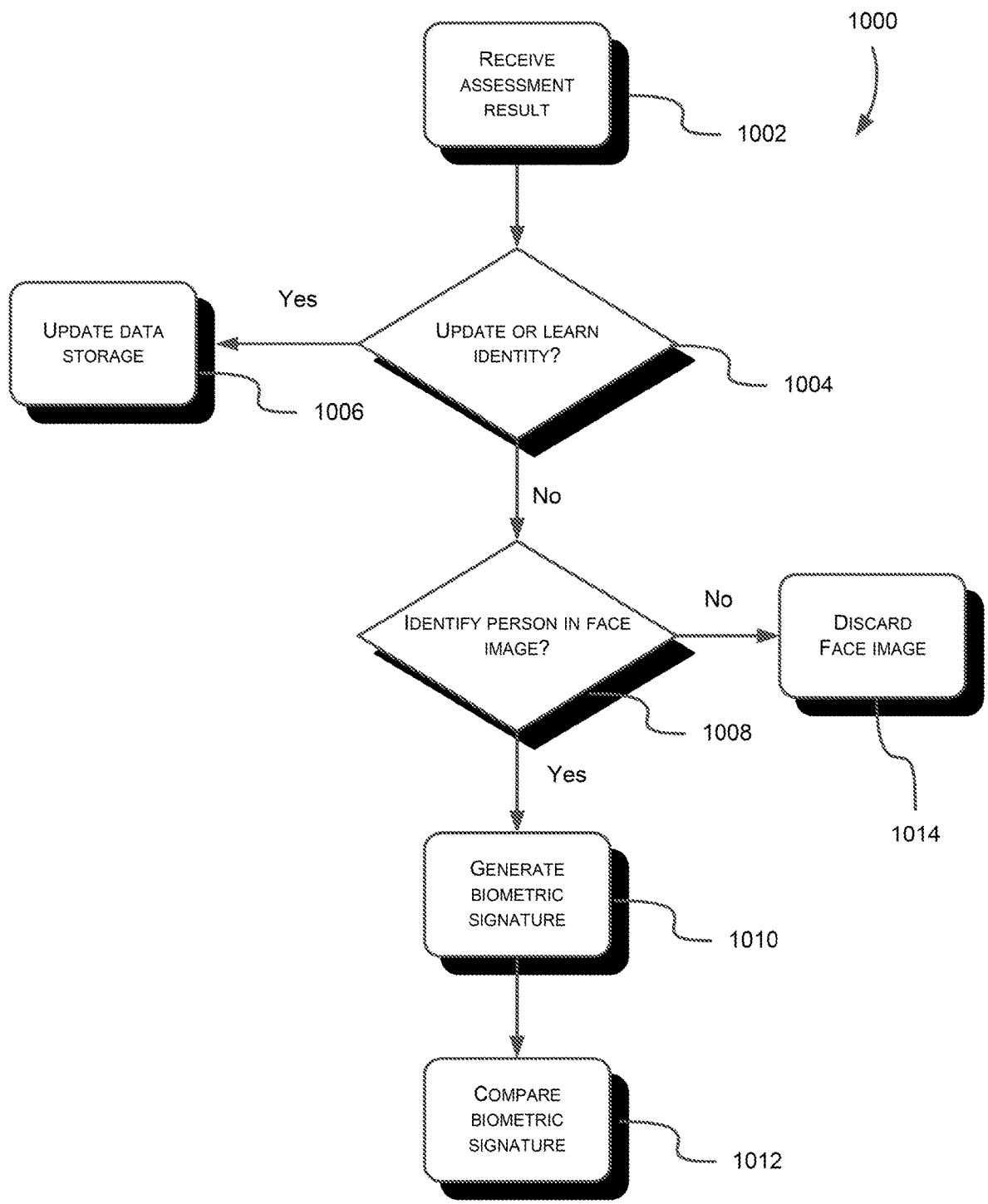
FIG. 10 shows a method for performing facial recognition processing.

FIG. 10 shows a method 1000 for performing facial recognition processing according to one or more embodiments. The method 1000 may be performed by one or more appropriate components of the system 100, such as the image processing module 210. The method 1000 is performed in connection with advancing 610 the face image 114 for facial recognition processing of the method 600 and as described elsewhere herein. The method 1000 begins by receiving 1002 or otherwise obtaining the assessment output 206 indicating result information 208 regarding the assessment performed. The result information 208 may include the assessment information 118 or otherwise indicate that certain facial recognition processing operations are to be performed. Receiving 1002 the result information 208 may include receiving the face image 114 or a reference thereto.

The method 1000 includes determining 1004 whether to update an existing identity or learn a new identity based on the result information 208. The result information 208 may indicate that the image assessment information 118 satisfies criteria for learning or updating an identity according to the face image criteria 108. In some embodiments, the result information 208 specifies which of the face image criteria 108 the assessment information 118 satisfies and the system 100 may determine whether to update or learn an identity based on the criteria specified. In some embodiments, the result information 208 may include instructions instructing to update an identity or learn a new identity. In some embodiments, the result information 208 may include some or all of the assessment information 118, which is used to determine whether to update or learn an identity based on the face image criteria 108. If it is determined to update or learn the identity in 1004, the method 1000 proceeds to update 1006 the data storage 214 as described with respect to FIG. 11 below and elsewhere herein.

If the system 100 determines 1004 not to update or learn an identity, e.g., by virtue of the assessment information 118 failing to satisfy an appropriate set of criteria, the system 100 proceeds to determine 1008 whether to identify the person depicted in the face image 114 based on the result information 208. The result information 208 may indicate that the image assessment information 118 satisfies criteria identifying a person according to the face image criteria 108. In some embodiments, the result information 208 specifies which of the face image criteria 108 the assessment information 118 satisfies and the system 100 may determine to identify the person depicted in the face image 114 based on the criteria specified. In some embodiments, the result information 208 may include instructions instructing the system 100 to identify the person depicted in the face image 114. In some embodiments, the result information 208 may include some or all of the assessment information 118, which is used to determine 1008 whether to identify the person based on the face image criteria 108.

If it is determined in 1008 to identify the person depicted in the face image 114, the method 1000 proceeds to generate 1010 a biometric signature 212 of the face image 114. Then, the system 100 compares 1012 the biometric signature 212 generated to the stored biometric signatures 216 in the data storage 214 to determine a match. If the biometric signature 212 generated is sufficiently similar to one of the stored biometric signatures 216, the system 100 returns information indicating the identity of the person depicted in the face image 114. The process of comparing 1012 the biometric signature 212 to the stored biometric signatures 216 is potentially time and resource intensive. By comparing those face images 114 having attributes matching the face image criteria 108, the rate of false positives is reduced and the efficiency of the system 100 is improved. That is, the resources of the system 100 are directed to performing facial recognition processes on select face images 114 having high resolution, sharpness, and contrast quality, and those representing face poses likely to produce a positive identification. If, in 1008, the system 100 determines not to identify 1008 the person in the face image 114, the face image 114 is discarded 1014 (e.g., not stored in memory), and the system 100 proceeds to obtain 612 the next face image 114 in the method 600 or proceeds to another set of operations defined herein.

Figure 11:
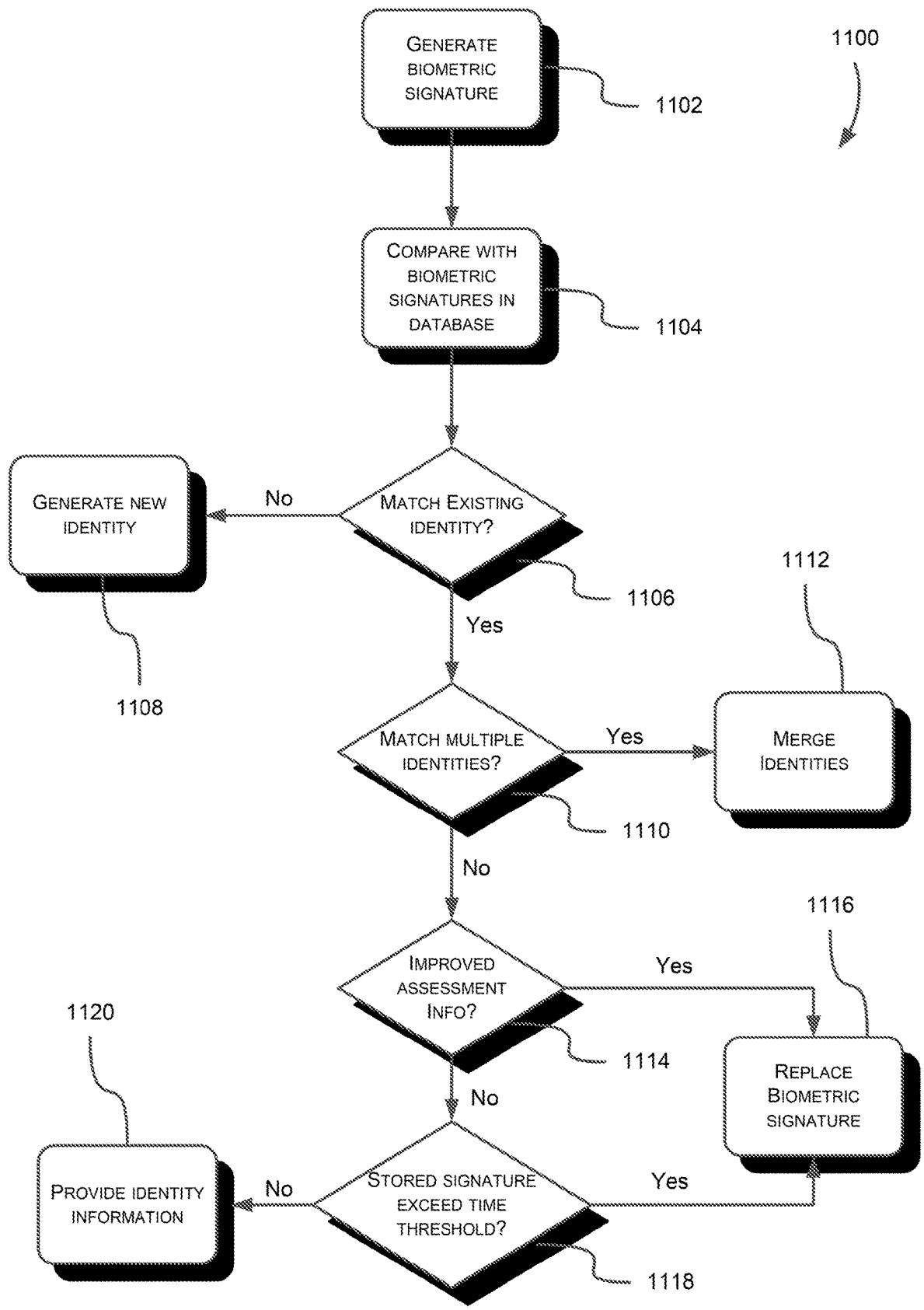
FIG. 11 shows a method for updating contents of data storage involved in facial recognition processing.

FIG. 11 shows a method 1100 of updating data storage according to one or more embodiments. The method 1100 is performed as part of or in connection with updating 1006 data storage in the method 1000. The method 1100 may be performed by one or more appropriate components of the system 100, such as the image processing module 210. The method 1100 is performed as a result of the system 100 determining that the face image 114 has characteristics sufficient to satisfy a set of criteria for learning, updating, or merging identities. The set of criteria for performing the method 1100 may be different than the criteria for determining whether to identify a person in a face image 114. It may be desirable to use high quality face images 114 as a basis for determining which face images 114 are suitable to use as a reference for identifying persons, so the set of criteria for performing the method 1100 may be higher than the set of criteria for determining whether to identify a person in 1008 of FIG. 10.

The method 1100 begins by generating 1102 a biometric signature 212 of the face image 114. Then, the biometric signature 212 generated is compared 1102 with the stored biometric signatures 216 to determine a match. If the system 100 determines 1104 that there is no match between the biometric signature 212 and one of the stored biometric signatures 216 (No at 1106), the method 1100 may proceed to generate 1108 a new identity for the biometric signature 212 generated in 1102. This may include obtaining identifying information regarding the person depicted, such as name, age, identification numbers. In some embodiments, the information regarding the identity of the person may be obtained via user input. Thereafter, the method 1100 may terminate and the system 100 may return to another operation described herein, such as obtaining 612 the next face image 114 to be evaluated in the method 600.

If the system 100 determines 1104 that a match exists between the biometric signature 212 and one of the stored biometric signatures 216 (Yes at 1106), the method 1100 next proceeds to determine whether the biometric signature 212 is a match to multiple identities. For instance, the system 100 may determine that the biometric signature 212 is sufficiently similar to a plurality of stored biometric signatures 216 each corresponding to a different identity or person. In such an event, the method 1100 may proceed to merge 1112 the plurality of identities. Merging 1112 the identities may include evaluating the assessment information 118 associated with the face image 114 of the biometric signature 212 under consideration. The system 100 may determine whether the assessment information 118 satisfies a set of criteria for merging identities as a condition precedent to merging 1112. The set of criteria for merging 1112 identities may include different criteria than the set of criteria for updating 1004 or identifying 1008 discussed with respect to the method 1000—for example, the set of criteria for merging 1112 may include higher thresholds for the size information 304, the pose information 306, the sharpness information 308, or the contrast quality information 310. In some embodiments, the system 100 may not merge 1112 the identities if information stored in association with the stored biometric signatures 216 if there are inconsistencies associated with the identities. If, for example, the identities have different social security numbers associated or the there is an indication that a twin exists for the person, the system 100 may not merge the identities.

Next, the method 1100 proceeds by determining 1114 whether the assessment information 112 represents an improvement over the assessment information 118 of the stored biometric signature 216 matched with the biometric signature 212. If so, the method 1100 proceeds to replace 1116 the corresponding stored biometric signature 216 with the current biometric signature 212 and the associated assessment information 118. This will ensure that the biometric signature 212 used as a basis for determining the identity of a person is of high quality.

At 1118, the method 1100 involves determining whether the stored biometric signature 216 for which a match was determined exceeds a defined time threshold. In particular, the system 100 determines a time period between a current time and date and the time and date at which the stored biometric signature 216 was captured. If the time period exceeds a defined time period threshold, the stored biometric signature 216 is replaced 1116 with the current biometric signature 212. The defined time period threshold is an alphanumeric value stored in memory that indicates a time period after which the stored biometric signature 216 should be replaced. This ensures that the stored biometric signatures 216 are recent so that old face images 114 are not used as a basis for facial recognition processing. If the time period for the stored biometric signature 216 does not exceed the time period threshold, the method 1100 proceeds to provide 1120 identity information regarding the identity of the person with whom the biometric signature 212 was matched in 1106.

Figure 12:
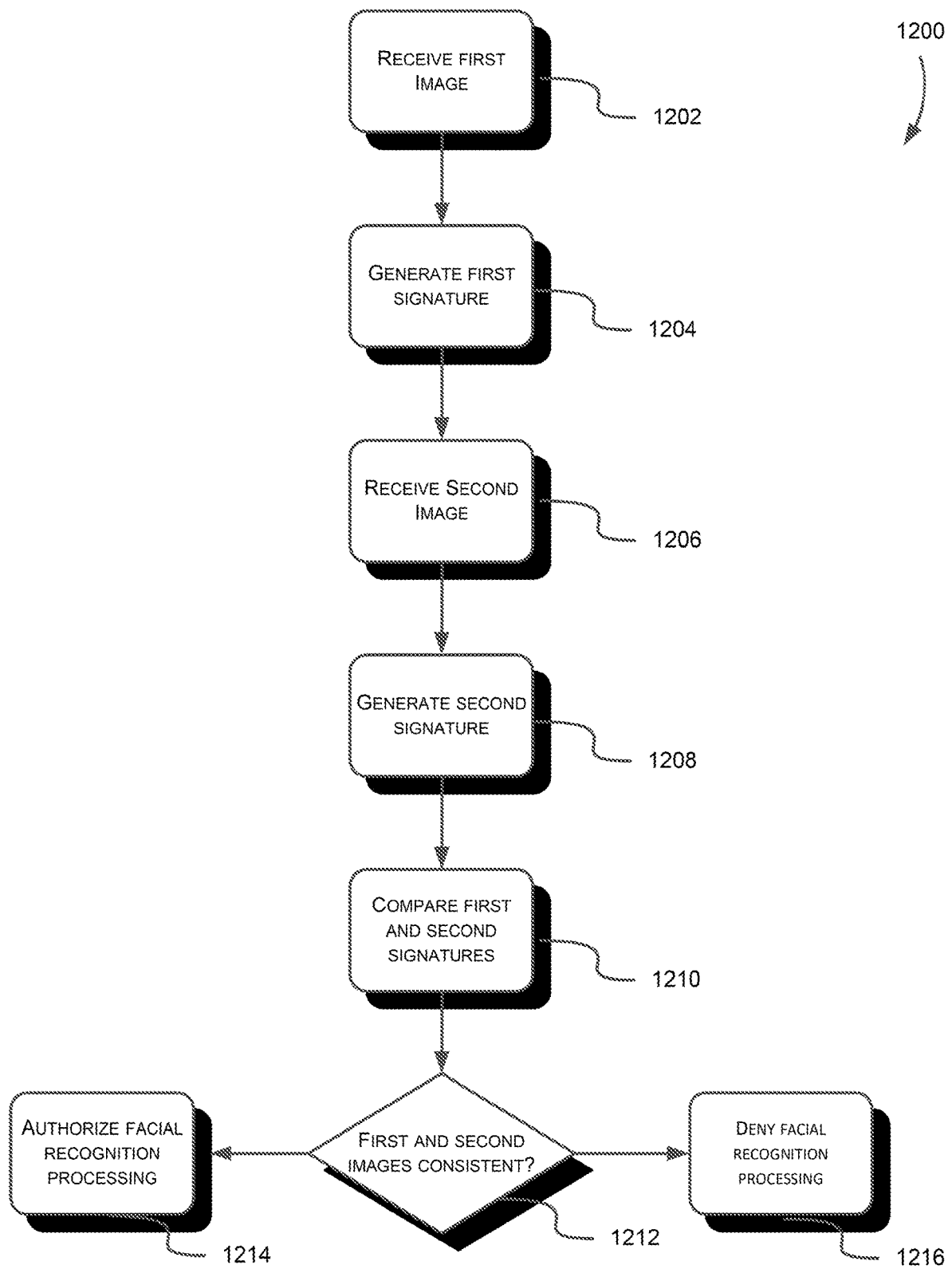
FIG. 12 shows a method for verifying the consistency of images received.

FIG. 12 shows a method 1200 for verifying the consistency of the images 104 being evaluated or subimages thereof. The method 1200 is performed as part of or in connection with 607 of the method 600. The method 1200 may be performed by one or more appropriate components of the system 100, such as the image assessment module 204. The method 1200 begins by receiving 1202 a first image captured by the camera 106. In some embodiments, the first image may be a first image 104 of the plurality of images 105 that contains one or more face images 114 to be evaluated. In some embodiments, the first image may be the face image 114 currently being evaluated in an image 104 of the plurality of images 105. Next, the method 1200 includes generating 1204 a first signature of the first image. For instance, the system 100 may generate a biometric signature 212 of the face image 114 being evaluated.

The method 1200 includes receiving 1206 a second image captured by the camera 106. In some embodiments, the second image is an image 104 sequential to the first image in the plurality of images 105. In some embodiments, the second image is the face image 114 of the same person captured in an image 104 sequential to the first image in the plurality of images 105. Thereafter, the method 1200 includes generating 1208 a second signature of the second image received in 1206—for example, generating a biometric signature of the face image 114 corresponding to the second image.

The method 1200 further includes comparing 1210 the first signature and the second signature to determine a degree of similarity or correspondence therebetween. For instance, the system 100 may compare vectors and points between the first and second signatures to determine how similar they are. The system 100 may generate a set of numerical values indicating differences between the first and second signatures. At 1212, the method 1200 involves determining whether the first and second images are consistent based on the comparison of the signatures in 1210. The determination 1212 of whether the first image and the second image are consistent may be based on a comparison to a threshold or range for acceptable consistency or similarity.

If the system 100 determines that a result of the comparison 1210 indicates sufficient similarity between the first image and the second image, the method 1200 proceeds to authorize 1214 facial recognition processing. For instance, the system 100 may generate result information 208 indicating that the image being evaluated is consistent or stable. If, on the other hand, it is determined that the result of the comparison 1210 indicates insufficient similarity, the method 1200 proceeds to deny 1216 facial recognition processing for the image 104 or face image 114 being considered for evaluation.

Consistency, as discussed herein, indicates that sequential images 104 are stable such that the image 104 or face image 114 being evaluated is undistorted or not blurred. Inconsistent images 104 or face images 114 may capture subjects who are in motion or in which other subject matter may disrupt image evaluation. For instance, cigarette smoke in an image may distort a face image 114 captured such that it has difficult features to discern. As another example, a person running or in the process of turning may have blurred features if captured during motion. Verifying the consistency of the images helps to ensure that resources of the system 100 are not wasted on processing blurred, moving, or otherwise suboptimal images.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method, comprising:
   receiving a plurality of images; and
   for each of one or more face images in the plurality of images:
      generating assessment information that includes contrast information regarding a contrast quality of the face image;
      comparing the assessment information for the face image with a first set of criteria that includes a first contrast quality criterion;
      determining, as a result of comparing the assessment information with the first set of criteria, whether the assessment information associated with the face image satisfies the first set of criteria;
      identifying, in response to determining that the assessment information satisfies the first set of criteria, the face image as being qualified for facial recognition processing;
      determining that the assessment information satisfies a second set of criteria that includes a second contrast quality criterion;
      generating, as a result of determining that the assessment information satisfies the second set of criteria, a biometric signature of the face image; and
      storing the biometric signature as a result of determining that the assessment information represents an improvement over a stored biometric image.

2. The computer-implemented method of claim 1, wherein the assessment information includes sharpness information regarding a sharpness of the face image, the set of criteria includes a sharpness criterion, and determining that the assessment information satisfies the first set of criteria includes determining that the sharpness information satisfies the sharpness criterion.

3. The computer-implemented method of claim 1, wherein generating the assessment information includes:
   identifying a plurality of features in the face image that correspond to predetermined facial features;
   determining a plurality of regions of the face image that respectively surround a feature of the plurality of features;
   assigning contrast values to each region of the plurality of regions based on a maximum pixel contrast of pixels in each region; and
   determining a sum of the contrast values of the plurality of regions.

4. The computer-implemented method of claim 3, wherein determining that the assessment information satisfies the first set of criteria includes determining that the sum of the contrast values satisfies the contrast criterion.

5. The computer-implemented method of claim 1, wherein the first set of criteria comprises an orientation criterion, and generating the assessment information includes generating orientation information that includes estimating an orientation of the face in the face image, and determining that the assessment information satisfies the first set of criteria includes determining that the orientation information satisfies the orientation criterion.

6. The computer-implemented method of claim 1, wherein the assessment information includes size information identifying one or more size dimensions of the face image, the first set of criteria includes a size criterion, and determining that the assessment information satisfies the first set of criteria includes determining that the size information satisfies a size threshold in the first set of criteria.

7. The computer-implemented method of claim 1, wherein the face image is a first face image, the assessment information is first assessment information including first contrast information, the biometric signature is a first biometric signature, and the method further comprising:
   obtaining a second face image;
   generating second assessment information of the second face image that includes second contrast information regarding a contrast quality of the second face image;
   determining that the second assessment information satisfies the second set of criteria that includes the second contrast quality criterion; and
   generating, as a result of determining that the second assessment information satisfies the second set of criteria, a second biometric signature of the second face image.

8. The computer-implemented method of claim 7, further including comparing the first biometric signature of the first face image to the second biometric signature of the second face image.

9. The computer-implemented method of claim 1, wherein each criterion of the second set of criteria includes different values than each corresponding criterion of the first set of criteria.

10. The computer-implemented method of claim 7, wherein the second face image is obtained at a second time, the method further comprising:
   storing the first biometric signature of the first face image as being associated with an identity in data storage at a first time previous to the second time; and
   storing the second biometric signature of the second face image as a result of a determination that a time period between the first time and the second time exceeds a predetermined threshold.

11. The computer-implemented method of claim 1, further comprising:
generating a second biometric signature for a second face image consecutive to the face image in the plurality of images; and
determining an image differential based on a comparison of the biometric signature and the second biometric signature, wherein analyzing the face in the face image is performed as a result of the image differential being less than a predetermined threshold for image consistency.

12. The method of claim 1, further comprising:
detecting face images in at least a subset of images of the plurality of images, wherein generating the assessment information is in response to detecting the face image in the subset of images.

13. The method of claim 1, further comprising:
analyzing the face in the face image to determine an identity of a person corresponding to the face.

14. A system, comprising:
one or more processors; and
non-transitory storage medium storing a set of instructions that, as a result of execution by the one or more processors, cause the system to:
receive a plurality of images; and
for each of one or more face images in the plurality of images:
generate assessment information that includes contrast information regarding a contrast quality of the face image;
compare the assessment information with a first set of criteria that includes a first contrast quality criterion;
generate, as a result of determining that the assessment information satisfies the first set of criteria, result information indicating that the assessment information associated with the face image satisfies the first set of criteria;
compare the assessment information with a second set of criteria that includes a second contrast quality criterion;
generate, as a result of determining that the assessment information satisfies the second set of criteria, a biometric signature of the face image; and
store the biometric signature as a result of determining that the assessment information represents an improvement over a stored biometric image.

15. The system of claim 14, wherein the instructions, as a result of execution by the one or more processors, further cause the system to:
transmit, to a second system, the result information for authorizing the second system to perform facial recognition processing using the face image.

16. The system of claim 14, wherein the instructions, as a result of execution by the one or more processors, further cause the system to:
compare, as a result of determining that the assessment information satisfies the first set of criteria, the biometric signature with a plurality of biometric signatures stored in data storage;
determine, as a result of comparing the biometric signature with the plurality of biometric signatures, that the biometric signature does not correspond to a stored identity; and
create a new identity corresponding to the biometric signature.

17. The system of claim 14, wherein the instructions, as a result of execution by the one or more processors, further cause the system to:
compare, as a result of determining that the assessment information satisfies the first set of criteria, the biometric signature with a plurality of biometric signatures stored in data storage;
determine, as a result of comparing the biometric signature with the plurality of biometric signatures, that the biometric signature corresponds to a plurality of stored identities; and
merge the plurality of identities into a single stored identity.

18. The system of claim 14, wherein the assessment information includes a size of the face image, pose information regarding an orientation of a face in the face image, and sharpness information regarding a sharpness of the face image, and the first set of criteria includes a size criterion, an orientation criterion, and a sharpness criterion.

19. The system of claim 14, wherein the instructions, as a result of execution by the one or more processors, further cause the system to:
identify a plurality of features in the face image that correspond to predetermined facial features;
determine a plurality of regions of the face image that respectively surround each feature of the plurality of features;
compute maximum pixel difference values for the plurality of regions; and
compute an average pixel difference of the maximum pixel difference values, wherein the contrast information corresponds to the average pixel difference.

20. The system of claim 14, wherein the second set of criteria is different from the first set of criteria.

21. A non-transitory computer-readable medium storing computer-executable instructions that, as a result of execution by a processor, cause the processor to:
obtain a plurality of images; and
for each of one or more face images in the plurality of images:
generate assessment information that includes contrast information regarding a contrast quality of the face image;
compare the assessment information with a first set of criteria that includes a first contrast quality criterion;
generate, as a result of determining that the assessment information satisfies the first set of criteria, result information indicating that the assessment information associated with the face image satisfies the first set of criteria;
compare the assessment information with a second set of criteria that includes a second contrast quality criterion;
generate, as a result of determining that the assessment information satisfies the second set of criteria, a biometric signature of the face image; and
store the biometric signature as a result of determining that the assessment information represents an improvement over a stored biometric image.

22. The non-transitory computer-readable medium of claim 21, wherein the second set of criteria is different from the first set of criteria.

23. A computer-implemented method, comprising:
obtaining a first face image at a first time;
generating first assessment information of the first face image that includes first contrast information regarding a first contrast quality of the first face image;

comparing the first assessment information for the first face image with a first set of criteria that includes a first contrast quality criterion;

determining, as a result of comparing the first assessment information with the first set of criteria, whether the first assessment information associated with the first face image satisfies the first set of criteria;

generating, as a result of determining that the first assessment information satisfies the first set of criteria, a first biometric signature of the first face image storing the first biometric signature of the first face image as being associated with an identify;

obtaining a second face image at a second time;

generating second assessment information of the second face image that includes second contrast information regarding a second contrast quality of the second face image;

determining that the second assessment information satisfies a second set of criteria that includes a second contrast quality criterion;

generating, as a result of determining that the second assessment information satisfies the second set of criteria, a second biometric signature of the second face image; and storing the second biometric signature of the second face image as a result of a determination that a time period between the first time and the second time exceeds a predetermined threshold.

* * * * *